US012620047B2

(12) United States Patent
Chen et al.

(10) Patent No.: US 12,620,047 B2
(45) Date of Patent: *May 5, 2026

(54) SYSTEMS AND METHODS FOR MATCHING AUTONOMOUS TRANSPORTATION PROVIDER VEHICLES AND TRANSPORTATION REQUESTS IN TRANSPORTATION MANAGEMENT SYSTEMS

(71) Applicant: Lyft, Inc., San Francisco, CA (US)

(72) Inventors: Jessica Yunan Chen, San Francisco, CA (US); Gavin Sebastian Hurley, San Francisco, CA (US); Leighton Kamaile Jen, Redwood City, CA (US); Jonathan Patrick O'Keefe, Oakland, CA (US); Oleg Vadim Panichev, San Francisco, CA (US); Robert Earl Rasmusson, Jr., San Francisco, CA (US); John Tighe, San Francisco, CA (US); Alexis Weill, San Francisco, CA (US); Adam Alexander Wolf, San Francisco, CA (US)

(73) Assignee: Lyft, Inc., San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 18/053,667

(22) Filed: Nov. 8, 2022

(65) Prior Publication Data

US 2023/0153937 A1 May 18, 2023

Related U.S. Application Data

(63) Continuation of application No. 16/368,848, filed on Mar. 28, 2019, now Pat. No. 11,532,060.

(51) Int. Cl.
*G06Q 50/40* (2024.01)
*G06Q 50/47* (2024.01)
*G08G 1/00* (2006.01)

(52) U.S. Cl.
CPC .............. *G06Q 50/40* (2024.01); *G06Q 50/47* (2024.01); *G08G 1/202* (2013.01)

(58) Field of Classification Search
CPC .......... G06Q 50/40–50/47; G08G 1/20; G08G 1/207
See application file for complete search history.

(56) References Cited

U.S. PATENT DOCUMENTS 10,042,359 B1 * 8/2018 Konrardy ............... G06Q 50/40
10,185,999 B1 * 1/2019 Konrardy ............... G06Q 40/08
(Continued)

OTHER PUBLICATIONS

Fagnant, The future of fully automated vehicles: opportunities for vehicle-and ride-sharing, with cost and emissions savings, Doctoral dissertation, 2014 (Year: 2014).*

*Primary Examiner* — Daniel Vetter
(74) *Attorney, Agent, or Firm* — ALG Intellectual Property, LLC

(57) ABSTRACT

The disclosed computer-implemented method may determine one or more characteristics of an autonomous vehicle, determine one or more characteristics of one or more road segments of a geographic area, determine at least one geographic zone for the autonomous vehicle within the geographic area based at least on the characteristics of the autonomous vehicle and the characteristics of the one or more road segments of the at least one geographic area, and match a request with the autonomous vehicle within the at least one geographic zone based at least in part on a request location and a destination location of the request being associated with the at least one geographic zone. Other
(Continued)

methods, systems, and computer-readable media are disclosed.

20 Claims, 13 Drawing Sheets

(56) References Cited

U.S. PATENT DOCUMENTS

| | | | | |
|---|---|---|---|---|
| 11,062,396 | B1 * | 7/2021 | Konrardy | G06Q 40/04 |
| 2015/0339928 | A1 * | 11/2015 | Ramanujam | G06Q 50/40 701/23 |
| 2018/0341895 | A1 * | 11/2018 | Kislovskiy | G06Q 50/40 |
| 2018/0342034 | A1 * | 11/2018 | Kislovskiy | G06Q 50/40 |
| 2018/0342035 | A1 * | 11/2018 | Sweeney | G06Q 50/40 |
| 2019/0026671 | A1 * | 1/2019 | Al Falasi | G01C 21/3438 |
| 2020/0050978 | A1 * | 2/2020 | Perez Barrera | G06Q 50/40 |

* cited by examiner

SYSTEMS AND METHODS FOR MATCHING AUTONOMOUS TRANSPORTATION PROVIDER VEHICLES AND TRANSPORTATION REQUESTS IN TRANSPORTATION MANAGEMENT SYSTEMS

CROSS REFERENCE TO RELATED APPLICATION

This application is a continuation of and claims the benefit of U.S. application Ser. No. 16/368,848, filed 28 Mar. 2019, the disclosure of which is incorporated, in its entirety, by this reference.

BACKGROUND

Some transportation services may provide transportation on demand, drawing from a transportation provider supply pool to meet the needs of those requesting transportation services as the needs arise. The transportation provider supply pool may include autonomous transportation provider vehicles. However, technology for autonomous transportation provider vehicles is rapidly evolving and fulfilling requests by arbitrarily matching available autonomous transportation provider vehicles with pending transportation requests may result in wasted transportation supply resources, an unacceptable fluctuation in the level of available autonomous transportation provider vehicles, increased transportation time, or other suboptimal results. For example, certain autonomous transportation provider vehicles may be better suited to providing certain transportation services better than other autonomous transportation provider vehicles and a transportation service may experience transportation requests for autonomous transportation provider vehicles in a geographic region that is unable to support transportation services by certain autonomous transportation provider vehicles.

The performance of an on-demand transportation service may depend on properly determining the suitability of providing transportation services using autonomous transportation provider vehicles in certain geographic zones. Accordingly, decisions about when and how to match a transportation service request with an autonomous transportation provider vehicle within a geographic zone may pose trade-offs for on-demand transportation services and consumers of on-demand transportation services.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
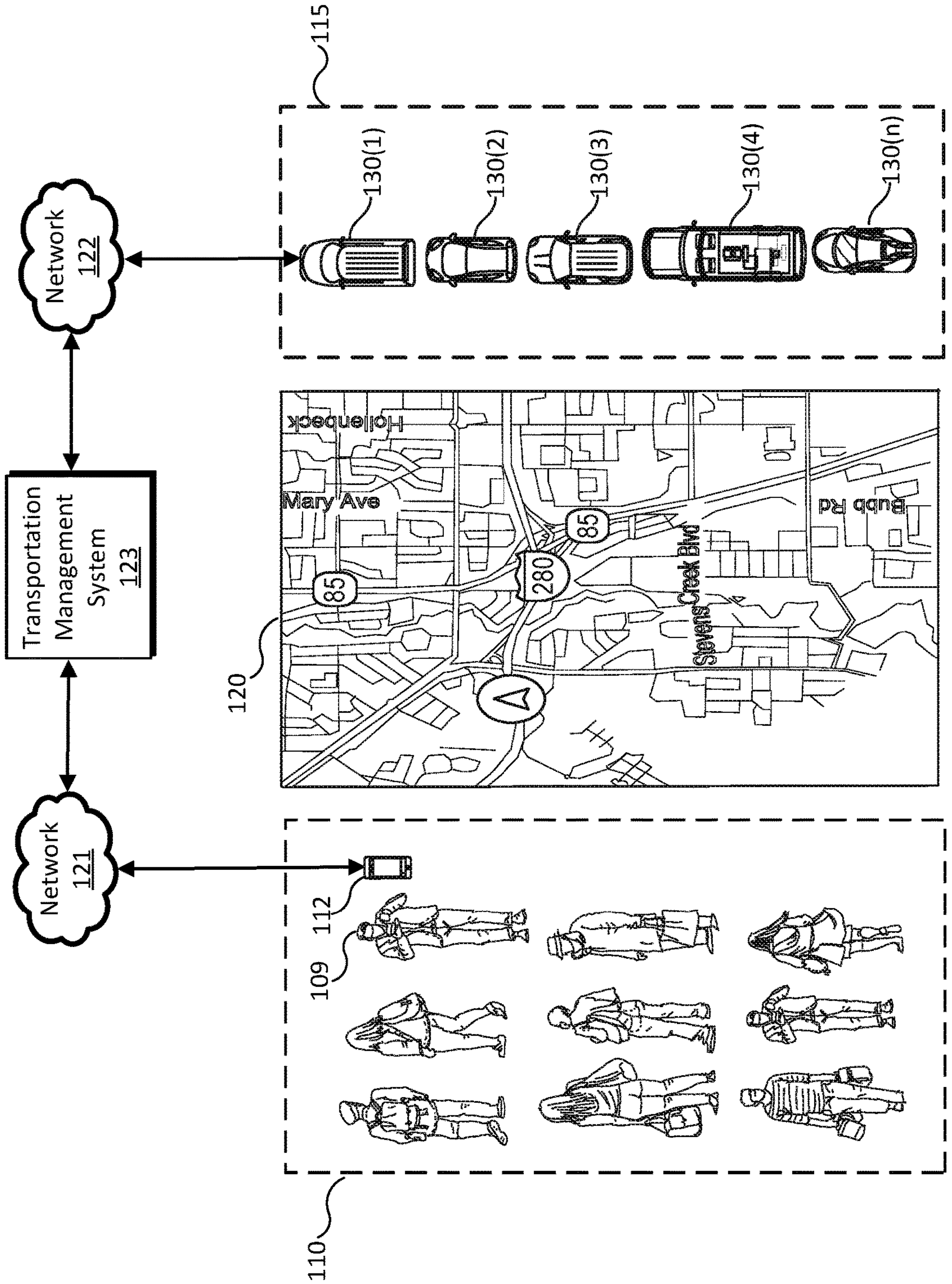
FIG. 1 is an illustration of transportation requestors and autonomous transportation provider vehicles in a geographic area.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to matching autonomous transportation provider vehicles and transportation requests in transportation management systems. Matching decisions between transportation requests and autonomous transportation provider vehicles in geographic areas may affect transportation service satisfaction levels of transportation requesters and value creation for transportation management systems. Autonomous transportation services may create high efficiency and performance in transportation management systems while conveniently providing on-demand transportation for transportation requestors.

Transportation requestors may be provided with options for transportation service including an option for autonomous transportation. However, autonomous transportation provider vehicles may be unable to provide transportation services in all geographic areas and under all conditions. Autonomous transportation provider vehicles may be able to provide services at certain times and/or in certain geographic areas (e.g., geographic zones). A transportation management system may be able to determine the conditions and geographic zones that autonomous transportation provider vehicles may be able to provide transportation services and match transportation requests based on the determined geographic zones.

As will be explained in greater detail below, matching autonomous transportation provider vehicles and transportation requests in transportation management systems may be based on, without limitation, the characteristics (e.g., capabilities) of an autonomous transportation provider vehicle, road surface characteristics of a geographic zone, characteristics of a transportation requestor, characteristics of a transportation request, or any combination thereof. Matching autonomous transportation provider vehicles and transportation requests in a transportation management system using the systems methods disclosed herein may provide benefits to the operation of the transportation management system. Accordingly, as may be appreciated, the systems and methods described herein may improve the functioning of a computer that implements transportation matching. For example, these systems and methods may improve the functioning of the computer by improving transportation matching results. Additionally or alternatively, these systems and methods may improve the functioning of the computer by reducing the computing resources consumed to identify appropriate transportation matchings (and, e.g., thereby freeing computing resources for other tasks, such as those directly and/or indirectly involved in transportation matching).

Furthermore, for the reasons mentioned above and to be discussed in greater detail below, the systems and methods described herein may provide advantages to the field of transportation management and/or the field of autonomous transportation. In addition, these systems and methods may provide advantages to autonomous vehicles that operate as a part of a transportation management system. For example, the vehicles may complete transportation tasks more quickly, more efficiently (e.g., in terms of fuel, vehicle wear, etc.), and/or more safely (e.g., by driving, on average, shorter distances to complete the same transportation objective). Further, these systems and methods may provide advantages to on-demand consumer and/or enterprise systems other than transportation management systems such as autonomous delivery services (e.g., food delivery services, package delivery services, etc.).

FIG. 1 is an illustration of transportation requestors and autonomous transportation provider vehicles in a geographic area. As shown in FIG. 1, a transportation management system may include a set of transportation requestors 110 and a set of autonomous transportation provider vehicles 115 that includes autonomous transportation provider vehicles 130(1) to 130(*n*). Transportation requestors 110 may desire transportation services from autonomous transportation provider vehicles 115 within geographic area 120. Transportation requestor 109 of the set of transportation requestors 110 may request a transportation service using electronic device 112 (e.g., smart phone). The transportation request may include a request for transportation in geographic area 120. The transportation request may include a general request for transportation service that may include transportation service using a variety of transportation service types or may include a specific request for transportation service using an autonomous transportation provider vehicle. Electronic device 112 may provide the request for transportation service to transportation management system 123 through network 121. Autonomous transportation provider vehicles 130(1) to 130(*n*) may be available to provide transportation to one or more transportation requestors of the set of transportation requestors 110 in geographic area 120. Autonomous transportation provider vehicles 130(1) to 130(*n*) may include an electronic device (e.g., embedded computing device, electronic computing module, smartphone, etc.) that sends and receives information associated with characteristics of the respective autonomous transportation provider vehicle and information associated with the transportation request to and from transportation management system 123 through network 122. Although FIG. 1 shows network 121 and network 122 as different networks, the present disclosure is not limited to such. Network 121 and network 122 may be the same network or may be different networks.

Geographic area 120 may have certain geographic zones that are unsuitable for autonomous transportation provider vehicles 130(1) to 130(*n*) to provide transportation services. Geographic area 120 may have certain other geographic zones that are suitable for autonomous transportation provider vehicles 130(1) to 130(*n*) to provide transportation services. Each of autonomous transportation provider vehicles 130(1) to 130(*n*) may have different characteristics as described in detail below. The suitability of autonomous transportation provider vehicles 130(1) to 130(*n*) to provide transportation services in certain geographic zones may be based on the specific characteristics of the autonomous transportation provider vehicle as they relate to the road surface characteristics of the geographic zone. Determining the suitability of autonomous transportation provider vehicles 130(1) to 130(*n*) to provide transportation services in certain geographic zones may be determined based on, without limitation, the characteristics (e.g., capabilities) of the vehicle, road surface characteristics of the geographic zone, characteristics of a transportation requestor, characteristics of the transportation request, or any combination thereof. Determining the suitability of autonomous transportation provider vehicles 130(1) to 130(*n*) to provide transportation services in certain geographic zones may be determined using any suitable method. In some examples, determining the suitability of autonomous transportation provider vehicles 130(1) to 130(*n*) to provide transportation services in certain geographic zones may be determined based on the methods described below in relation to FIG. 4.

Autonomous transportation provider vehicles 130(1) to 130(*n*) may be of the same or different types. The different types may be based on characteristics of the vehicle. The characteristics of the vehicle may determine which geographic zones the vehicle may provide transportation services. Characteristics of transportation provider vehicles 130(1) to 130(*n*) may include, without limitation, a manufacturer of the vehicle, a model of the vehicle, a seating capacity of the vehicle, a transportation requestor seating capacity of the vehicle, a training level of the vehicle associated with the geographic zone, a training level of a monitoring operator associated with the vehicle, a storage space capacity of the vehicle, a capability level of the vehicle to perform driving maneuvers, a capability level of the vehicle to traverse routes within the geographic zone, an authorization level of the vehicle to traverse routes within the geographic zone, a level of access to characteristic data associated with the vehicle, or a combination thereof.

A transportation management system may use various types of transportation provider vehicles including without limitation, human operated vehicles, semi-autonomous (e.g., human assisted) vehicles, and fully autonomous vehicles. A transportation management system may use autonomous transportation provider vehicles 130(1) to 130(*n*) provided by different manufacturers. Each manufacturer may provide different models of autonomous transportation provider vehicles and each model may have different functional options. The suitability of autonomous transportation provider vehicles 130(1) to 130(*n*) to provide transportation services in certain geographic zones may be based on the manufacturer, the model, the functional options, or a combination thereof. For example, autonomous transportation provider vehicles 130(1) to **130(*n*) may have different passenger and/or operator (e.g., human assistant) seating capacities. Autonomous transportation provider vehicles 130(1) to 130(*n*) may have a total seating capacity. A seating capacity associated with a transportation request may be equal to the total seating capacity minus the operator seating capacity. In some examples, the number of operators may be, without limitation, 0 (e.g., no human assistants), 1, or 2. Matching a transportation request to autonomous transportation provider vehicles 130(1) in to 130(*n*)** in a geographic zone may be based at least on the seating capacity of the vehicle and/or the number of seats associated with the transportation request.

In some examples, autonomous transportation provider vehicles 130(1) to **130(*n*) may be trained to autonomously traverse certain travel routes with geographic area 120. The travel routes that autonomous transportation provider vehicles 130(1) to 130(*n*) are trained to autonomously traverse may be located within one or more geographic zones that may be located within geographic area 120. Autonomous transportation provider vehicles 130(1) to 130(*n*) may be trained to autonomously traverse certain travel routes in order to provide transportation services along those routes within a geographic zone. Autonomous transportation provider vehicles 130(1) to 130(*n*) may use computing methods (e.g., artificial intelligence, machine learning, image processing, neural networks, etc.) in combination with sensor devices (e.g., image sensors, radar, infrared, ultrasonic, lidar, etc.), road mapping data, and wireless communications to learn methods of autonomous traversal of certain travel routes. Matching a transportation request to autonomous transportation provider vehicles 130(1) to 130(*n*) in a geographic zone may be based at least on which travel routes the vehicles have been trained to traverse. In some examples, autonomous transportation provider vehicles 130(1) to 130(*n*)** may only be matched to transportation requests that traverse routes that the vehicles have been trained on.

Operation of an autonomous transportation provider vehicle may be controlled by a computing system (e.g., embedded computing device, electronic computing module, smartphone, etc.). In some examples, one or more human assistants may monitor and/or supervise the operation of the autonomous transportation provider vehicle controlled by the computing system. Autonomous transportation provider vehicles 130(1) to **130(*n*) may have an operator to monitor the operation and travel of autonomous transportation provider vehicles 130(1) to 130(*n*). The operator may monitor the operation of autonomous transportation provider vehicles 130(1) to 130(*n*) during periods of route training and/or during periods of providing transportation services. The operator may be trained to different levels of ability in monitoring the operation of the vehicles and/or trained to monitor certain types of autonomous transportation provider vehicles (e.g., certain models, manufacturers, options, etc.) and/or trained to monitor operation in certain geographic zones. Matching a transportation request to autonomous transportation provider vehicles 130(1) in to 130(*n*) in a geographic zone may be based at least on the training level of the operator that monitors the vehicle. In some examples, autonomous transportation provider vehicles 130(1) to 130(*n*)** may only be matched to transportation requests that traverse routes that the operator has been trained on.

In some examples, autonomous transportation provider vehicles 130(1) to **130(*n*) may have a storage space capacity associated with the vehicle. The storage space capacity may be without limitation, a storage space capacity within a trunk or a storage space capacity within the interior space of the vehicle. The storage space capacity may be used for storage of luggage and/or packages of a transportation requestor. Matching a transportation request to autonomous transportation provider vehicles 130(1) in to 130(*n*)** in a geographic zone may be based at least on the storage space capacity of the vehicle.

In some examples, autonomous transportation provider vehicles 130(1) to **130(*n*) may have a capability level to perform driving maneuvers. Autonomous transportation provider vehicles 130(1) to 130(*n*) may be able to perform different driving maneuvers based on, without limitation, characteristics of the vehicle, characteristics of traffic control devices within geographic area 120, a training level of the vehicle, a training level of an operator monitoring the vehicle, a type of terrain (e.g., road surface type, inclination, etc.) the vehicle is operating on, a weather condition within geographic area 120, a density of vehicle traffic within geographic area 120, a density of pedestrian traffic within geographic area 120, or a combination thereof. For example, autonomous transportation provider vehicles 130(1) to 130(*n*) may have a capability to stop at designated drop-off locations, stop at designated pick-up locations, perform U-turns, perform right turns, perform left turns, perform left turns at intersections with traffic lights, perform left turns at intersections without traffic lights, merge into lanes of traffic, depart from lanes of traffic, perform parallel parking, change lanes of travel, avoid moving objects, avoid stationary objects, or a combination thereof. Matching a transportation request to autonomous transportation provider vehicles 130(1) in to 130(*n*)** in a geographic zone may be based at least on a capability level of the vehicle to perform driving maneuvers.

In some examples, autonomous transportation provider vehicles 130(1) to **130(*n*) may have authorization to traverse certain routes within certain geographic zones in geographic area 120. For example, autonomous transportation provider vehicles 130(1) to 130(*n*) may have authorization to traverse routes within an airport, a hotel, a toll road, a neighboring country, a government-controlled area, a military installation, etc. Authorization to traverse certain routes may be provided to autonomous transportation provider vehicles 130(1) to 130(*n*) based on, without limitation, regulatory restrictions, a type of vehicle, characteristics of the vehicle, a toll associated with the authorization, time of day, a day of the week, or a combination thereof. Matching a transportation request to autonomous transportation provider vehicles 130(1) to 130(*n*)** in a geographic zone may be based at least on an authorization level of the autonomous transportation provider vehicle to traverse routes within the geographic zone.

In some examples, a transportation management system may have access to data associated with autonomous transportation provider vehicles 130(1) to **130(*n*). The data may represent characteristics and/or capabilities of the vehicles as described in detail above. The transportation management system may have differing levels of access to the characteristic data associated with autonomous transportation provider vehicles 130(1) to 130(*n*). In some examples, the level of access to characteristic data associated with autonomous transportation provider vehicles 130(1) to 130(*n*) may affect the geographic zones in which the vehicles may provide transportation services, the types of transportation requests the vehicle may be matched with, or a combination thereof. A transportation management system may have differing levels of access to data relating to the vehicle manufacturer, model type, seating capacity, transportation requestor seating capacity, training level within a geographic zone, training level of a monitoring operator, storage space capacity, capability level to perform driving maneuvers, or a combination thereof. The level of access to data associated with autonomous transportation provider vehicles 130(1) to 130** (*n*) may be determined by the vehicle manufacturer. In some examples, a vehicle manufacturer may provide a transportation management system with access to certain data and may not provide access to the other certain data relating to the vehicles. Matching a transportation request to autonomous transportation provider vehicles 130(1) in to 130(*n*) in a geographic zone may be based at least on an access level to data associated with the autonomous transportation provider vehicle.

Figure 2:
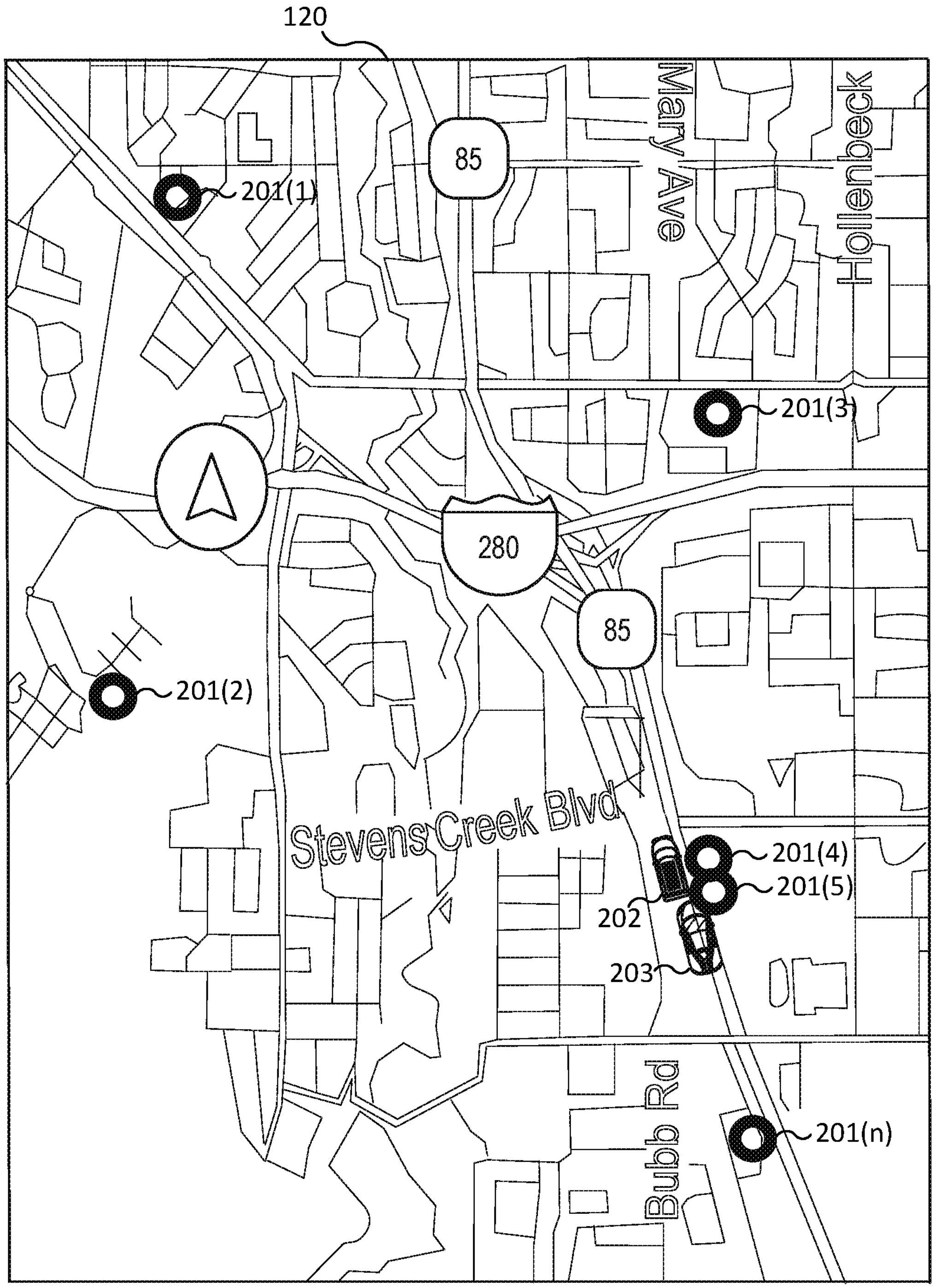
FIG. 2 is an illustration of designated pickup and drop-off locations associated with autonomous transportation provider vehicles in a geographic area.

FIG. 2 is an illustration of designated pickup and drop-off locations associated with autonomous transportation provider vehicles in a geographic area. Geographic area 120 may have designated locations in which transportation requestors may be picked up or dropped off in the course of autonomous transportation provider vehicles providing transportation services. Geographic area 120 may have designated pickup and drop-off locations 201(1) to 201(*n*). The location of designated pickup and drop-off locations 201(1) to 201(*n*) may be determined based on the ability of the transportation management system to efficiently and effectively match transportation requests with autonomous transportation provider vehicles in geographic area 120 using the designated pickup and drop-off locations. Although FIG. 2 shows six pickup and drop-off locations, the present disclosure is not limited to such and any number of pickup and drop-off locations may be designated in geographic area 120. Further, designated pickup and drop-off locations 201(1) to 201(*n*) may be determined using any suitable method. The designated pickup and drop-off locations may be static or may change dynamically based on the variables disclosed below. The designated pickup and drop-off locations may be determined based on, without limitation, characteristics of the autonomous transportation provider vehicles, road surface characteristics of pickup and drop-off locations, road surface characteristics of road segments in geographic area 120, characteristics of the transportation requestor, vehicle traffic density in the area surrounding the pickup and drop-off locations, pedestrian traffic density in the area surrounding the pickup and drop-off locations, an ability to perform driving maneuvers, weather conditions, a time of day, a day of the week, proximity to transportation requestors, or a combination thereof. Further, the pickup and drop-off locations may overlap one another. For example, pickup and drop-off locations 201(4) and 201(5) may overlap one another. In some examples, certain pickup and drop-off locations may be accessible to certain vehicles and not accessible to other vehicles. For example, pickup and drop-off locations 201(1), 201(2), 201(4), and 201(5) may be accessible by vehicle 202, whereas pickup and drop-off location 201(3) may be inaccessible to vehicle 202. As another example, pickup and drop-off locations 201(3) and 201(5) may be accessible by vehicle 203, whereas pickup and drop-off location 201(1), 201(2), and 201(4) may be inaccessible to vehicle 203. The pickup and drop-off locations accessible to certain vehicles may be determined based on the conditions and characteristics described below.

The designated pickup and drop-off locations may be determined based on characteristics of the autonomous transportation provider vehicles including, without limitation, physical dimensions of the vehicle, a training level of the autonomous vehicle to enter and/or exit the designated pickup and drop-off locations, or a combination thereof.

The designated pickup and drop-off locations may be determined based on road surface characteristics of the pickup and drop-off locations including, without limitation, physical dimensions of the location, obstructing objects near the location, pavement type, pavement condition, terrain, inclination, or a combination thereof. Matching a transportation request to autonomous transportation provider vehicles 130(1) in to 130(*n*) in a geographic zone may be based at least on comparing the one or more characteristics of the autonomous transportation provider vehicle with the characteristics of road surface of the geographic area. Comparing the one or more characteristics of the autonomous transportation provider vehicle with the characteristics of road surfaces of the geographic area may ensure that the autonomous transportation provider vehicle is capable of navigating within the geographic area, capable of navigating into and out of the pickup and drop-off locations, and capable of picking up and/or dropping off transportation requestors at the pickup and drop-off locations. The designated pickup and drop-off locations may be determined based on characteristics of the transportation requestor. For example, the designated pickup and drop-off locations may be determined based on a transportation requestor's ability (e.g., physical limitation) to enter or exit the vehicle at the pickup and/or drop-off location, a distance from the transportation requestor's location to the pickup location, a distance from the drop-off location to the transportation requestor's destination, or a combination thereof. For example, a transportation requestor's physical limitation may include restriction to a wheelchair and the pickup and drop-off locations may need to be wheelchair accessible for the transportation requestor to enter and exit the vehicle. In some examples, a pickup location may be over a threshold distance from a transportation requestor's location and/or a drop-off location may be over a threshold distance from the transportation requestor's destination. The threshold distance may be determined based on an acceptable amount of time for the transportation requestor to traverse the distance.

The designated pickup and drop-off locations may be determined based on a density of vehicle and/or pedestrian traffic in an area surrounding the pickup and/or drop-off locations. For example, the designated pickup and drop-off locations may be determined based on whether the density of vehicle traffic and/or pedestrian traffic may have a negative impact on the ability of the autonomous transportation provider vehicles to pickup and/or drop off the transportation requestor. In some examples, the density of vehicle traffic and/or pedestrian traffic in an area surrounding the pickup and/or drop-off locations may be below a threshold level that enables the autonomous transportation provider vehicles to effectively and efficiently pickup and/or drop off the transportation requestor.

The designated pickup and drop-off locations may be determined based on an ability of the autonomous transportation provider vehicle to perform driving maneuvers. For example, the autonomous transportation provider vehicle may be able to pull in to a designated pickup location, pull out of a designated pickup location, change lanes to pull in and/or pull out of a designated pickup or drop-off location, perform a parallel park maneuver, perform a perpendicular park maneuver, perform a K-turn maneuver, or a combination thereof. In some examples, the ability of the autonomous transportation provider vehicle to perform driving maneuvers in an area surrounding the pickup and/or drop-off locations may enable the autonomous transportation provider vehicles to effectively and efficiently pickup and/or drop off the transportation requestor. For example, if a pickup and drop-off location requires the autonomous transportation provider vehicle to change lanes and the autonomous transportation provider vehicle is unable to change lanes to enter the pickup and drop-off location, the pickup and drop-off location may be inaccessible to the autonomous transportation provider vehicle. As another example, if a pickup and drop-off location requires the autonomous transportation provider vehicle to perform a parallel park maneuver and the autonomous transportation provider vehicle is unable to perform a parallel park maneuver, the pickup and drop-off location may be inaccessible to the autonomous transportation provider vehicle.

The designated pickup and drop-off locations may be determined based on weather conditions surrounding the designated pickup and drop-off locations. For example, certain pickup and drop-off locations may be designated based on, without limitation, an ambient temperature, a level of rain, a wind speed/direction, an amount of snowfall, or a combination thereof. The designated pickup and drop-off locations may also be determined based on a type of shelter that protects a transportation requestor from inclement weather at the pickup and drop-off locations. For example, if a pickup and drop-off location has a level of snow over a threshold, the autonomous transportation provider vehicle may be unable to enter the pickup and drop-off location and the pickup and drop-off location may be inaccessible to the autonomous transportation provider vehicle. As another example, if a pickup and drop-off location does not include a type of shelter that protects a transportation requestor from inclement weather, the pickup and drop-off location may be inaccessible to the autonomous transportation provider vehicle during times of inclement weather due to the transportation requestor desiring protection from the inclement weather.

The designated pickup and drop-off locations may be determined based on a time of day and/or a day of the week. For example, designated pickup and drop-off locations may be based on characteristics of the autonomous transportation provider vehicles that may be based on a time of day and/or a day of the week. Certain autonomous transportation provider vehicles may be unavailable for certain pickup and drop-off locations based on, without limitation, availability of operators during a time of day and/or a day of the week, availability of the autonomous transportation provider vehicles during a time of day and/or a day of the week, maintenance schedules for the autonomous transportation provider vehicles, or a combination thereof. Further, designated pickup and drop-off locations may be determined based on a level of transportation requests within certain geographic zones based on a time of day (e.g., rush hour) and/or a day of the week (e.g., weekday, weekend). If a level of transportation requests is below a threshold level during certain times of the day or week near a designated pick and drop-off location, the pickup and drop-off location may be undesignated for transportation requests.

The designated pickup and drop-off locations may be determined based on a proximity to transportation requestors. For example, the designated pickup and drop-off locations may be located in proximity to areas having a high demand for transportation requests. The designated pickup and drop-off locations may be located in proximity to, without limitation, high pedestrian traffic areas, event venues, hotels, housing, attractions, transportation hubs (e.g., subways, trains, airports, seaports, etc.), or a combination thereof. The designated pickup and drop-off locations may be determined based on proximity to locations in which a level of transportation requests is over a threshold level.

Figure 3:
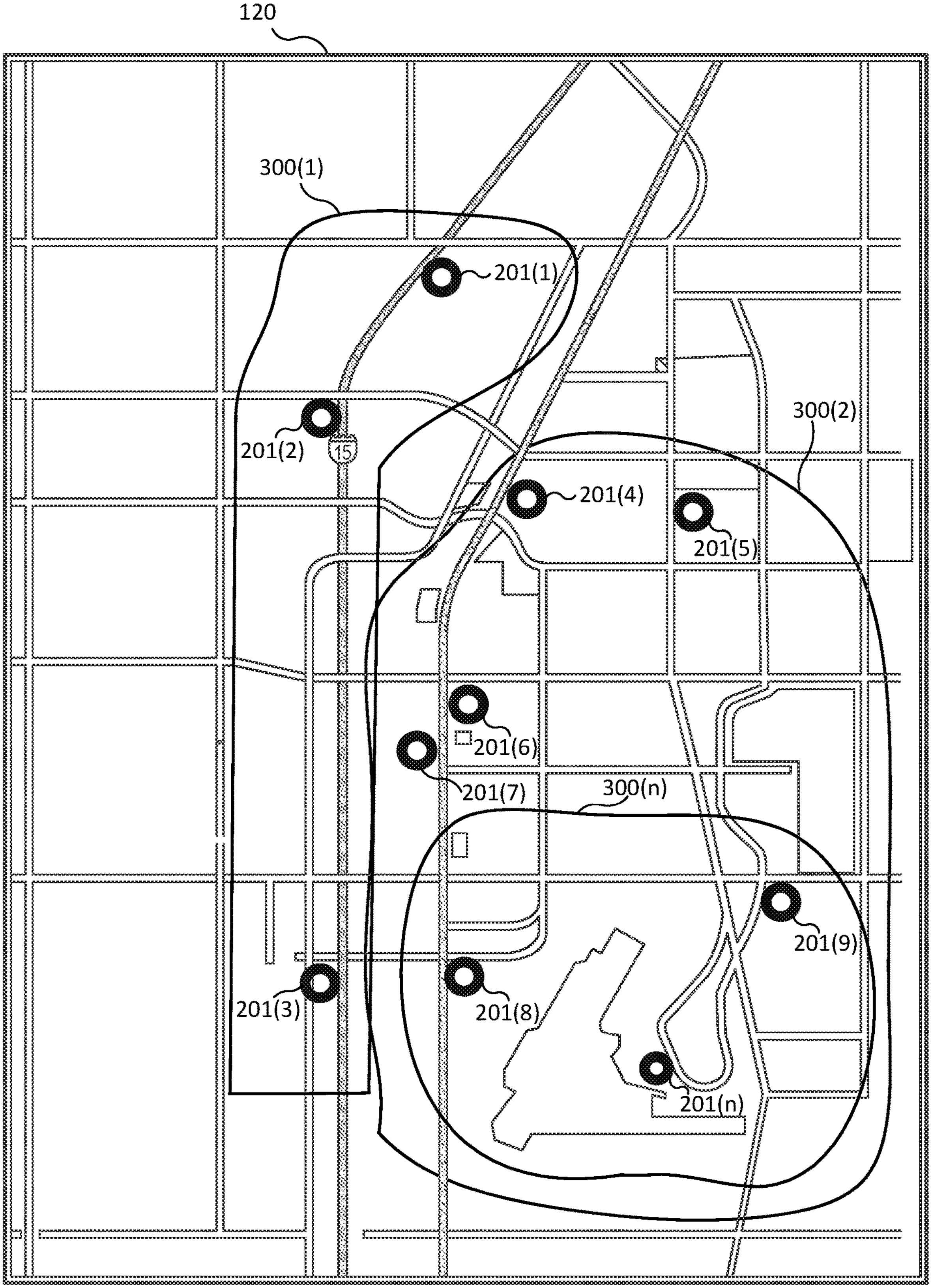
FIG. 3 is an illustration of geographic zones designated for autonomous transportation provider vehicle travel in a geographic area.

FIG. 3 is an illustration of geographic zones designated for autonomous transportation provider vehicle travel in a geographic area. Referring to FIG. 3, geographic area 120 may include geographic zones 300(1) to 300(*n*) in which autonomous transportation provider vehicles may travel and provide transportation services. Geographic area 120 may include any number of geographic zones and the geographic zones may extend over any and all areas within geographic area 120 and/or outside of geographic area 120. Geographic zones 300(1) to 300(*n*) may include a perimeter (e.g., geofence) of any shape in which autonomous transportation provider vehicles may provide transportation services. Geographic zones 300(1) to 300(*n*) may be determined using any suitable method and may be displayed on a map such as the map of FIG. 3. Geographic zones 300(1) to 300(*n*) may be determined based on, without limitation, characteristics of the autonomous transportation provider vehicles, characteristics of road surfaces within geographic area 120, characteristics of transportation requests, characteristics of transportation requestors, or a combination thereof as described in detail above with respect to FIGS. 1 and 2. Geographic zones 300(1) to 300(*n*) may be static or dynamic. Geographic zones 300(1) to 300(*n*) may be dynamically updated (in real-time or in non-real time) as any of the aforementioned characteristics of the vehicles, road surfaces, requests and requestors are updated. Geographic zones 300(1) to 300(*n*) may be located in isolation from one another or may overlap partially or completely. For example, geographic zone 300(1) may be geographically isolated from geographic zones 300(2) and 300(*n*) while geographic zone 300(2) completely overlaps geographic zone 300(*n*). Pickup and drop-off locations 201(1) to 201(*n*) may be located within any of geographic zones 300(1) to 300(*n*) or in multiple geographic zones.

Geographic zones 300(1) to 300(*n*) may be accessible to different types of autonomous transportation provider vehicles including without limitation, human operated vehicles, semi-autonomous (e.g., human assisted) vehicles, and fully autonomous vehicles. Geographic zones 300(1) to 300(*n*) may be used in any suitable method for filtering transportation requests and determining the types of transportation requests the autonomous vehicles may service and how the transportation requests may be serviced. A transportation management system may use autonomous transportation provider vehicles provided by different manufacturers. Each manufacturer may provide different models of autonomous transportation provider vehicles and each model may have different functional options. Different specific vehicles within a particular fleet of vehicles or within a particular manufacturer of the vehicles may be able to access different pickup and drop-off locations. Further, geographic zones 300(1) to 300(*n*) may be accessible to different transportation service providers.

In some examples, geographic zones 300(1) to 300(*n*) may be a collection of road network segments or locations that autonomous transportation provider vehicles are capable of servicing transportation requests. For example, geographic zones 300(1) to 300(*n*) may be a collection of roads that allow vehicles to travel in one direction only, allow certain types of turns only on a particular segment of the road, allow pickups at certain locations but not drop-offs, allow drop-offs at certain locations but not pickups, or a combination thereof.

Figure 4:
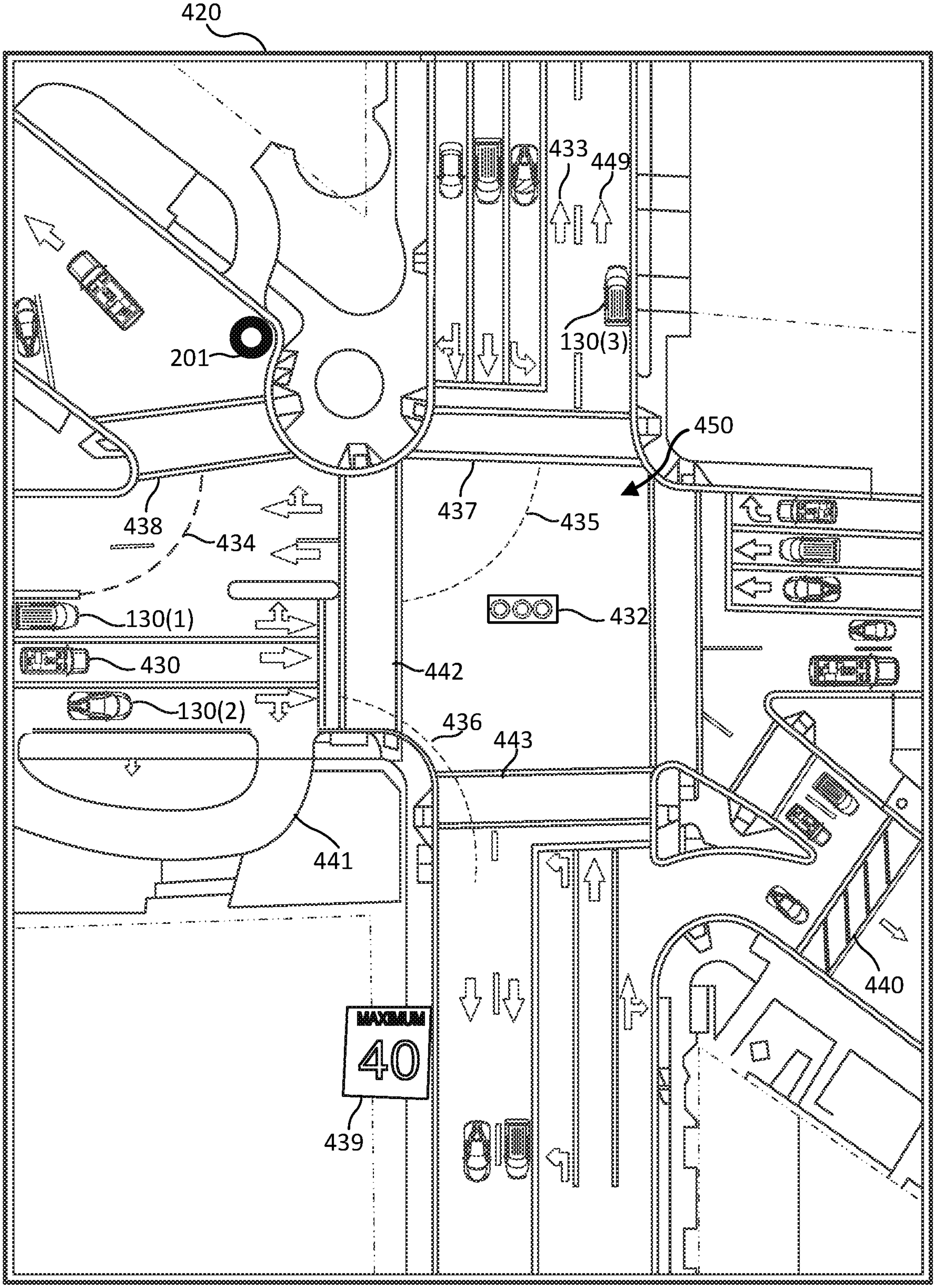
FIG. 4 is an illustration of driving maneuver capabilities of autonomous transportation provider vehicles.

FIG. 4 is an illustration of driving maneuver capabilities of autonomous transportation provider vehicles. As described above with respect to FIGS. 1 and 2, matching a transportation service request with an autonomous transportation provider vehicle within a geographic zone may be based at least in part on driving maneuver capabilities of the autonomous transportation provider vehicle. Autonomous transportation provider vehicles may have driving maneuver capabilities that include differing abilities to perform certain driving maneuvers. The ability of an autonomous transportation provider vehicles to perform a driving maneuver may be based on, without limitation, a training level of the vehicle, a training level of an operator monitoring the vehicle, a vehicle traffic density, a pedestrian traffic density, a type of vehicle, access to traffic signaling data (e.g., traffic light condition, speed limit data, lane restriction, curb access, etc.), or a combination thereof. Referring to FIG. 4, geographic area 420 may include autonomous transportation provider vehicles performing driving maneuvers in an environment that includes driver-controlled vehicles, pedestrians, traffic signaling, road surface conditions, intersections, etc. For example, autonomous transportation provider vehicle 130(1) may have an ability to perform a left turn from a leftmost lane. Autonomous transportation provider vehicle 130(1) may be able to perform a left turn at intersection 450 while following trajectory 435 and obeying traffic control signal 432. Autonomous transportation provider vehicle 130(1) may also be able to perform a left turn that is not at an intersection while following trajectory 434. In performing a left turn, autonomous transportation provider vehicle 130(1) may monitor oncoming traffic, pedestrian/vehicle traffic in cross walks 438 and/or 437, and a path of travel of adjacent vehicle 430 in order to make an unobstructed left turn. Further, autonomous transportation provider vehicle 130(1) may have an ability to enter and/or exit a traffic lane in order to enter and/or exit pickup/drop-off location 201. If autonomous transportation provider vehicle 130(1) does not have an ability to perform the driving maneuvers required to allow autonomous transportation provider vehicle 130(1) to enter or exit pickup/drop-off location 201, then autonomous transportation provider vehicle 130(1) may not be able to provide transportation services to transportation requestors near pickup/drop-off location 201. Further, the geographic zones may be determined by the ability of autonomous transportation provider vehicles to perform the driving maneuvers required to enter and exit pickup/drop-off locations, an ability to traverse the routes required to perform transportation services, or a combination thereof. Autonomous transportation provider vehicle 130(2) may be able to perform a right turn at intersection 450 while following trajectory 436, obeying traffic control signal 432, monitoring a path of travel of adjacent vehicle 430, and monitoring pedestrian/vehicle traffic in cross walks 442 and/or 443. Further autonomous transportation provider vehicle 130(2) may be able to perform a right turn into circular driveway 441. Autonomous transportation provider vehicles within geographic area 420 may also be capable of obeying (e.g., not exceeding) speed limit 439 and reducing a travel speed when traversing speed bump 440. In some examples, autonomous transportation provider vehicle 130(3) may be able to perform a lane change from right lane 449 to left lane 433 and/or from left lane 433 to right lane 449. Matching a transportation request to autonomous transportation provider vehicles in a geographic zone may be based at least on the ability of the autonomous transportation provider vehicles to perform driving maneuvers in the geographic zone.

Figure 5:
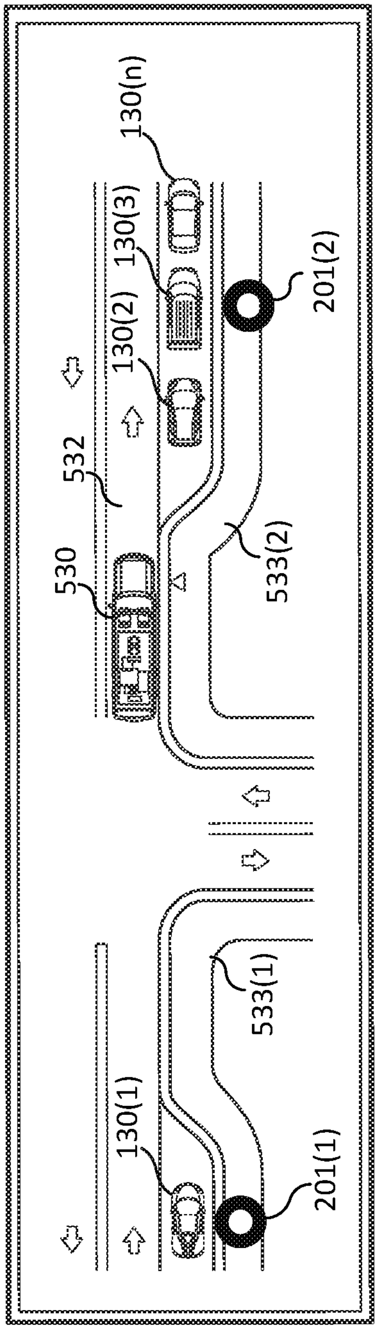
FIG. 5 is an illustration of designated pickup and drop-off locations associated with autonomous transportation provider vehicles.

FIG. 5 is an illustration of designated pickup and drop-off locations associated with autonomous transportation provider vehicles. As described above with respect to FIGS. 2 and 4, autonomous transportation provider vehicles may have an ability to perform certain driving maneuvers including pulling into and/or pulling out of designated pickup and drop-off locations. As shown in FIG. 5, designated pickup and drop-off locations 201(1) and 201(2) may be located in areas in which the autonomous transportation provider vehicles are capable of entering and/or exiting and are configured such that transportation requestors are able to enter and/or exit the vehicles. Pickup and drop-off locations 201(1) and 201(2) may be designated at certain locations on a map of the geographic area. Autonomous transportation provider vehicles 130(1) to 130(*n*) may be guided to pickup and drop-off locations 201(1) and 201(2) based on the locations designated in the map of the geographic area. For example, pickup and drop-off locations 201(1) and 201(2) may be located to a side of road 532 that autonomous transportation provider vehicles 130(1) to 130(*n*) are capable of entering into from road 532 and/or capable of exiting onto road 532. Road 532 may include vehicle traffic such as vehicle 530 and autonomous transportation provider vehicles 130(1) to 130(*n*) may be capable of merging out of vehicle traffic into pickup and drop-off locations 201(1) and 201(2) and/or merging into traffic on road 532 when exiting pickup and drop-off locations 201(1) and 201(2). Pickup and drop-off locations 201(1) and 201(2) may be located such that vehicles within the pickup/drop-off locations are protected from traffic on road 532 while being adjacent to pedestrian walkways 533(1) and 533(2) allowing transportation requestors to conveniently walk to pickup and drop-off locations 201(1) and 201(2).

Figure 6:
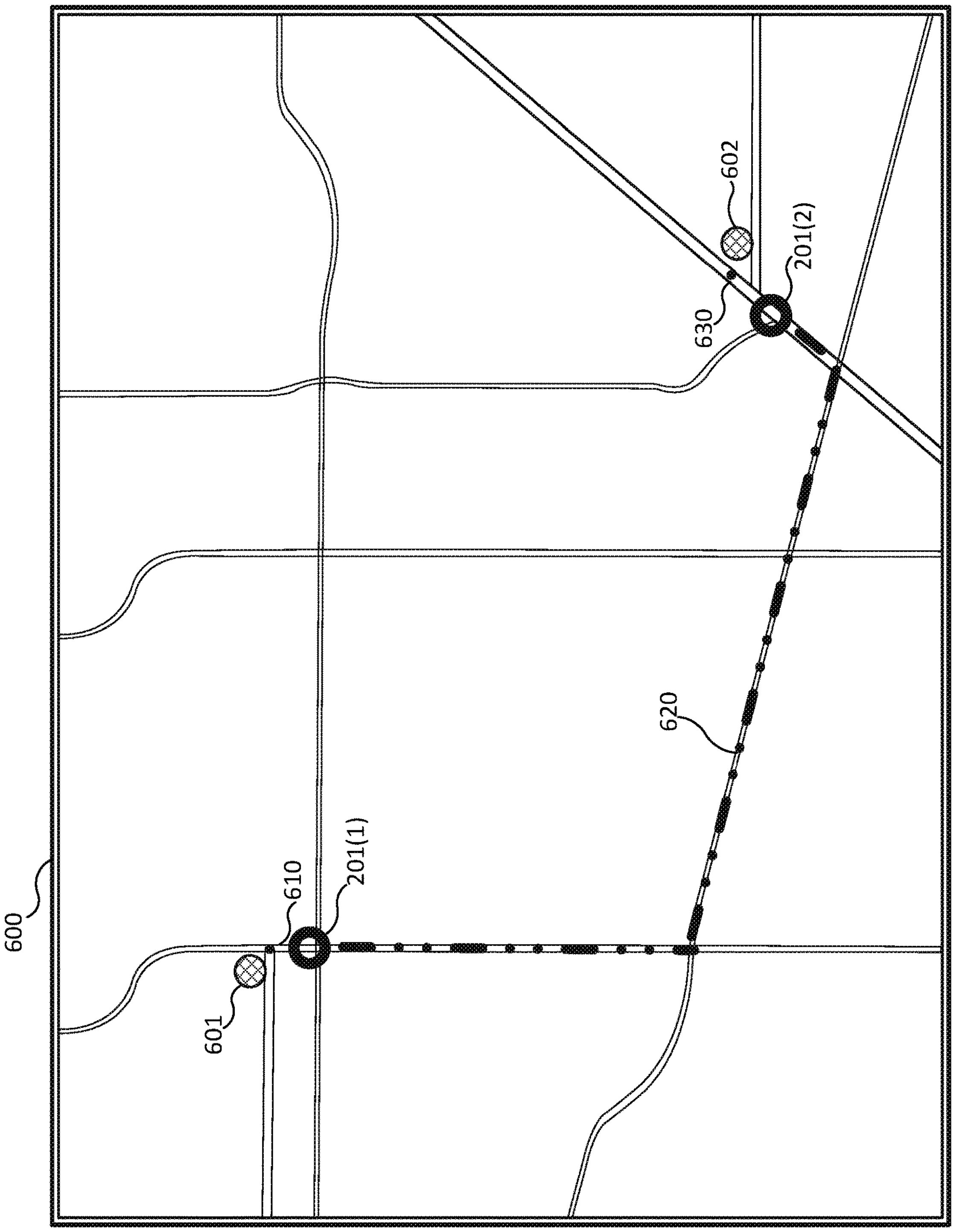
FIG. 6 is an illustration of travel routes for autonomous transportation provider vehicles and transportation requestors.

FIG. 6 is an illustration of travel routes for autonomous transportation provider vehicles and transportation requestors. As described above with respect to FIGS. 2, 4, and 5, a transportation management system may have designated pickup and drop-off locations for autonomous transportation provider vehicles to pickup and drop-off transportation requestors when providing transportation services. As shown in FIG. 6, geographic area 600 may include pickup and drop-off locations 201(1) and 201(2). A transportation requestor may desire transportation from origin location (e.g., current requestor location) 601 to destination location 602. In response to a request for transportation service from origin location 601 to destination location 602, a transportation management system may provide the transportation requestor transportation service from pickup location 201(1) to drop-off location 201(2) over transportation route 620. The transportation requestor may accept the match for transportation service and use an alternate transportation method to travel from origin location 601 to pickup location 201(1). The transportation requestor may travel from origin location 601 to pickup location 201(1) along route 610. In some examples, the transportation requestor may travel from origin location 601 to pickup location 201(1) using alternate transportation methods including, without limitation, walking, bike riding, personal mobility vehicle, train, another vehicle, or a combination thereof. Upon arrival at pickup location 201(1), the transportation requestor may travel in the autonomous transportation provider vehicle along route 620 to drop-off location 201(2). The transportation requestor may then travel from drop-off location 201(2) to destination location 602 along route 630 using any of the alternate transportation methods described above.

Figure 7:
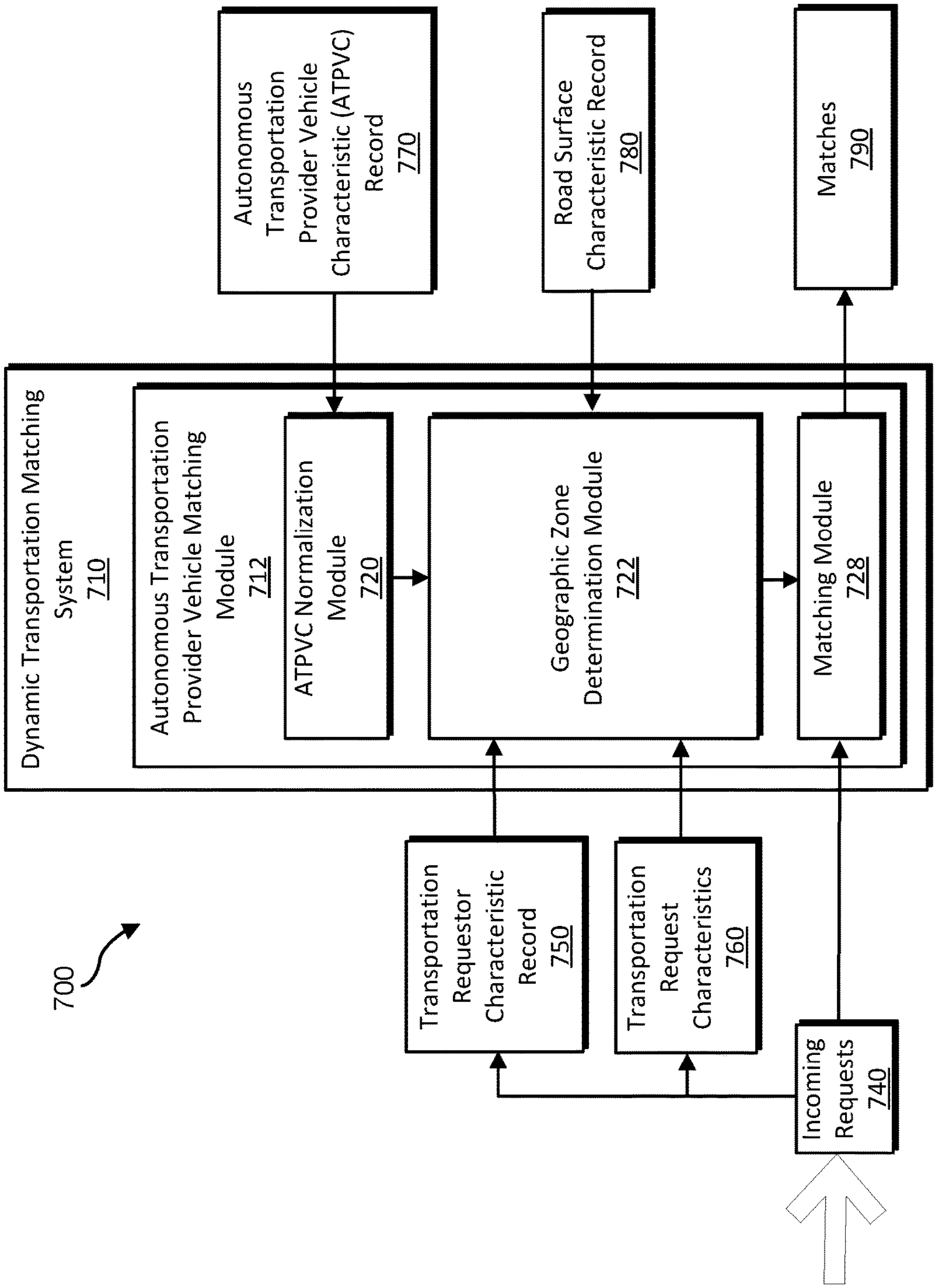
FIG. 7 is a block diagram of an example system for matching autonomous transportation provider vehicles and transportation requests in transportation management systems.

FIG. 7 is a block diagram of an example system for matching autonomous transportation provider vehicles and transportation requests in transportation management systems. As shown in FIG. 7, system 700 may include dynamic transportation matching system 710 configured with autonomous transportation provider vehicle matching module 712. Dynamic transportation matching system 710 may match a transportation service request with an autonomous transportation provider vehicle within a geographic zone based on, without limitation, characteristics of the autonomous transportation provider vehicle, characteristics of road surfaces of the geographic zone, characteristics of the transportation service request, characteristics of the transportation requester, or a combination thereof. Dynamic transportation matching system 710 may match a transportation service request with an autonomous transportation provider vehicle within a geographic zone using any suitable method. Dynamic transportation matching system 710 may match a transportation service request with an autonomous transportation provider vehicle within a geographic zone using autonomous transportation provider vehicle matching module 712. In one example, autonomous transportation provider vehicle matching module 712 may include autonomous transportation provider vehicle characteristic (ATPVC) normalization module 720, geographic zone determination module 722, and matching module 728. Autonomous transportation provider vehicle characteristic (ATPVC) record 770 may store characteristics of the autonomous transportation provider vehicle. ATPVC record 770 may store the characteristics of the autonomous transportation provider vehicle using any suitable storage method described below.

The characteristics of the autonomous transportation provider vehicles may include those described in detail above with respect to FIG. 1. ATPVC record 770 may store a record of the characteristics of the autonomous transportation provider vehicles based on, without limitation, a vehicle identification number, a manufacturer, a model, a type, a category, or a combination thereof. A type of vehicle may include, for example, an electric vehicle, a gasoline powered vehicle, a four-wheel drive vehicle, etc. A category of vehicle may include, for example, a sedan, a coupe, a convertible, a sport utility vehicle, etc. Further, ATPVC record 770 may update the stored record of the characteristics of the autonomous transportation provider vehicles based on polling external servers for updated records and/or receiving unsolicited (e.g., pushed) records of updated characteristics of the autonomous transportation provider vehicles from external servers. Updated characteristics of the autonomous transportation provider vehicles may include without limitation, updated vehicle training data, updated operator training data, updated maps of pickup/drop-off locations, updated driving maneuver capability, updated route authorization level, or a combination thereof. The updated route authorization level may be a route authorization level that has been updated by an authority. The route authorization level is described above in detail with respect to FIG. 1. The ATPVC record 770 may provide the records of the characteristics of autonomous transportation provider vehicles to ATPVC normalization module 720.

In some examples, ATPVC record 770 may optionally store records of the characteristics of autonomous transportation provider vehicles in different data formats and provide the records to ATPVC normalization module 720 in different data formats. ATPVC normalization module 720 may modify the data formats so that a common data format for the characteristics of autonomous transportation provider vehicles is provided to geographic zone determination module 722. ATPVC normalization module 720 may modify (e.g., normalize) the data formats using any suitable method including the methods described below with respect to FIG. 8. In some examples, ATPVC record 770 may store records of the characteristics of autonomous transportation provider vehicles in the same data formats in which case normalization of the data may not be required.

Road surface characteristic record 780 may store characteristics of road surfaces in a geographic area. Road surface characteristic record 780 may store the road surface characteristics of road segments using any suitable storage method described below. The characteristics of road surfaces may include those described in detail above with respect to FIG. 2. ATPVC record 770 may store a record of the characteristics of road surfaces based on, without limitation, a geographic area, a geographic zone, a pickup/drop-off location, a road, a geohash, a geofence, an intersection, a venue, or a combination thereof. The record of the characteristics of road surfaces stored in ATPVC record 770 may be used to generate a map showing the different characteristics. Further, road surface characteristic record 780 may update the stored record based on a polling of external servers for updated records and/or receiving unsolicited (e.g., pushed) records of updated characteristics of road surfaces from external servers. Updated characteristics of road surfaces may include without limitation, road closures, road maintenance, accidents, traffic conditions, power outages, smart traffic signals, weather conditions, or a combination thereof. Road surface characteristic record 780 may provide the records of the characteristics of road surfaces to geographic zone determination module 722.

Incoming requests 740 may be received from transportation requestor devices. Data associated with the transportation requests may be extracted from incoming requests 740 and provided to transportation requestor characteristic record 750 and transportation request characteristics 760. Transportation request characteristics 760 may extract information from incoming requests 740 related to a transportation request that requires matching and may include, without limitation, information associated with the transportation request origin location, transportation request destination, transportation requestor device location, transportation requestor device identification, a time of day associated with the transportation request, a number of passengers associated with the transportation request, a type of requested transportation service, or a combination thereof. Transportation request characteristics 760 may provide the characteristics of incoming transportation requests to geographic zone determination module 722 and matching module 728.

Transportation requestor characteristic record 750 may store characteristics of transportation requestors associated with incoming requests 740. Transportation requestor characteristic record 750 may store the characteristics of transportation requestors using any suitable storage method described below. The characteristics of transportation requestors may include, without limitation, a rating score associated with a transportation requestor, an acceptance of terms of service associated with a transportation requestor and a type of service (e.g., autonomous vehicle transportation service), a historical record of transportation requests associated with the transportation service requestor, a historical record of transportation service values associated with the transportation service requestor, demographic data associated with the transportation service requestor, or a combination thereof. Transportation requestor characteristic record 750 may provide the records of the characteristics of transportation requestors to geographic zone determination module 722.

In some examples, geographic zone determination module 722 may determine geographic zones within a geographic area in which autonomous transportation provider vehicles may provide transportation services. Geographic zone determination module 722 may determine geographic zones within a geographic area for providing transportation services using autonomous transportation provider vehicles using any suitable method. Geographic zone determination module 722 may determine geographic zones that are specific to an individual autonomous transportation provider vehicle or a group of autonomous transportation provider vehicles. Geographic zone determination module 722 may determine the geographic zone using data provided from, without limitation, transportation request characteristics 760, transportation requestor characteristic record 750, ATPVC normalization module 720, ATPVC record 770, road surface characteristic record 780, or a combination thereof.

Geographic zone determination module 722 may determine a geographic zone by determining a geographic zone associated with the autonomous transportation provider vehicle within the geographic area as described above in detail with respect to FIG. 3. Geographic zone determination module 722 may determine a geographic zone associated with the autonomous transportation provider vehicle and provide the determined geographic zone in any suitable form (e.g., map data, geofence, geohash, etc.) to matching module 728.

In some examples, incoming requests 740 for transportation services using an autonomous transportation provider vehicle may be provided to matching module 728 for matching the request. Incoming requests 740 may be matched using data from incoming request 740 and the determined geographic zones from geographic zone determination module 722 using any suitable method. For example, matching module 728 may match a transportation request with an autonomous transportation provider vehicle in response to the transportation request pickup location, drop off location, and travel route being within a geographic zone associated with the autonomous transportation provider vehicle. Matching module 728 may issue the matched transportation request to matches 790. Matches 790 may provide a match for transportation services to the transportation requestor device as described in detail below with respect to FIG. 10.

Figure 8:
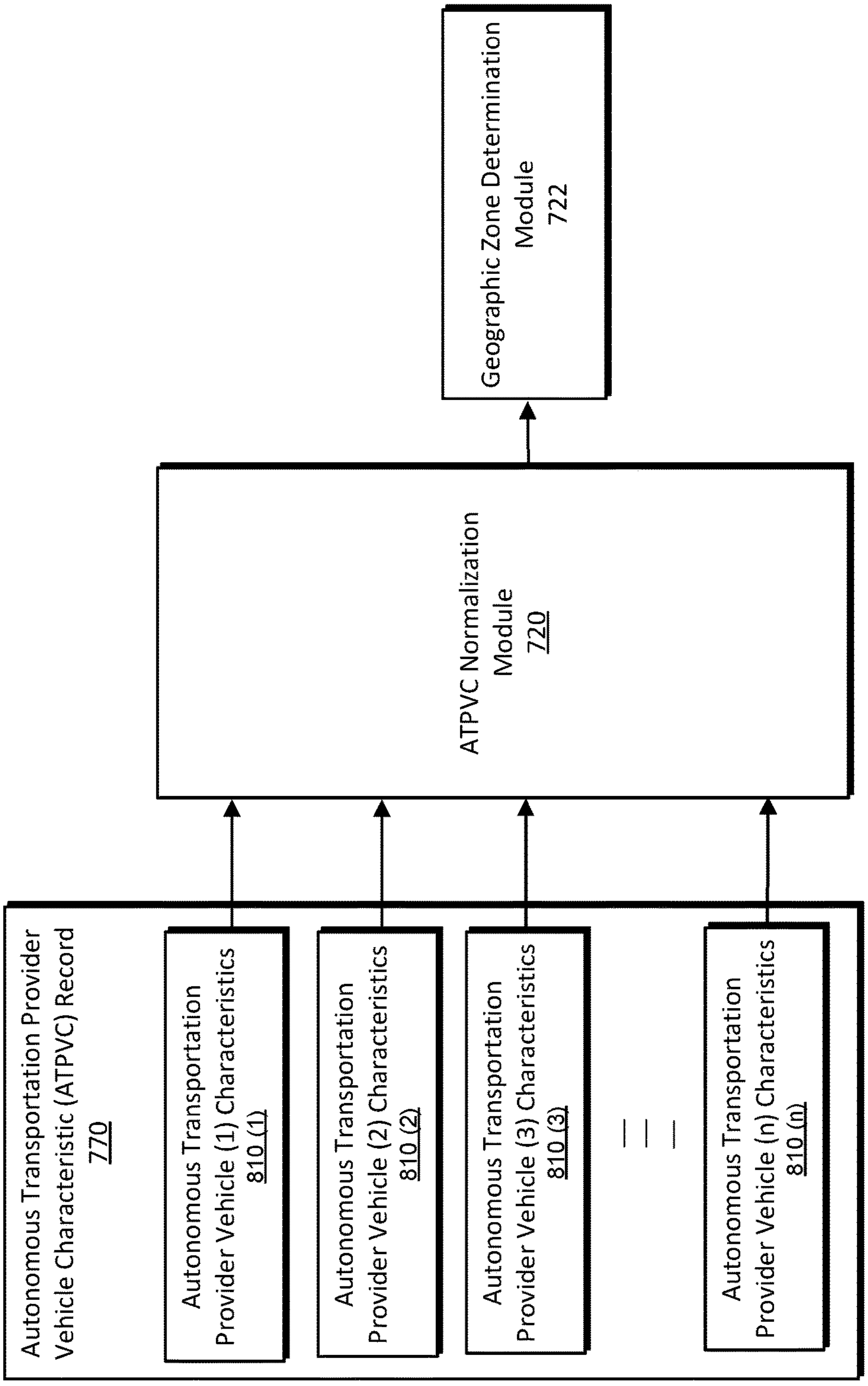
FIG. 8 is a block diagram of an example system for normalizing autonomous transportation provider vehicle characteristic data.

FIG. 8 is a block diagram of an example system for normalizing autonomous transportation provider vehicle characteristic data. As described above with respect to FIG. 7, ATPVC record 770 may optionally store records of the characteristics of autonomous transportation provider vehicles in different data formats and provide the records to ATPVC normalization module 720 in different data formats. In some examples, ATPVC record 770 may store autonomous transportation provider vehicle characteristics in a consistent data format. ATPVC record 770 may store autonomous transportation provider vehicle characteristics 810(1) to 810(*n*). The characteristics may vary among the vehicles as described in detail above with respect to FIG. 1. ATPVC normalization module 720 may receive (e.g., via polling and/or push methods) the characteristics from different data sources (e.g., different servers, different vehicle manufacturers, different service providers, etc.) and the different data sources may provide the data at different levels of details and/or different data formats. ATPVC record 770 may provide autonomous transportation provider vehicle characteristics 810(1) to 810(*n*) to ATPVC normalization module 720. ATPVC normalization module 720 may modify the data formats so that a common data format for the characteristics of autonomous transportation provider vehicles is provided to geographic zone determination module 722. ATPVC normalization module 720 may modify (e.g., normalize) the data formats using any suitable method. ATPVC normalization module 720 may adjust the values and formats of the data to a common scale and common format. ATPVC normalization module 720 may adjust the values and formats of the data using, without limitation, linear scaling, exponential scaling, rounding, transforming, mean normalization, min-max scaling, database mapping, parsing, concatenation, indexing, translating, reformatting, or a combination thereof. ATPVC normalization module 720 may provide the normalized autonomous transportation provider vehicle characteristics to geographic zone determination module 722 for use in determining geographic zones for autonomous transportation provider vehicles.

Figure 9:
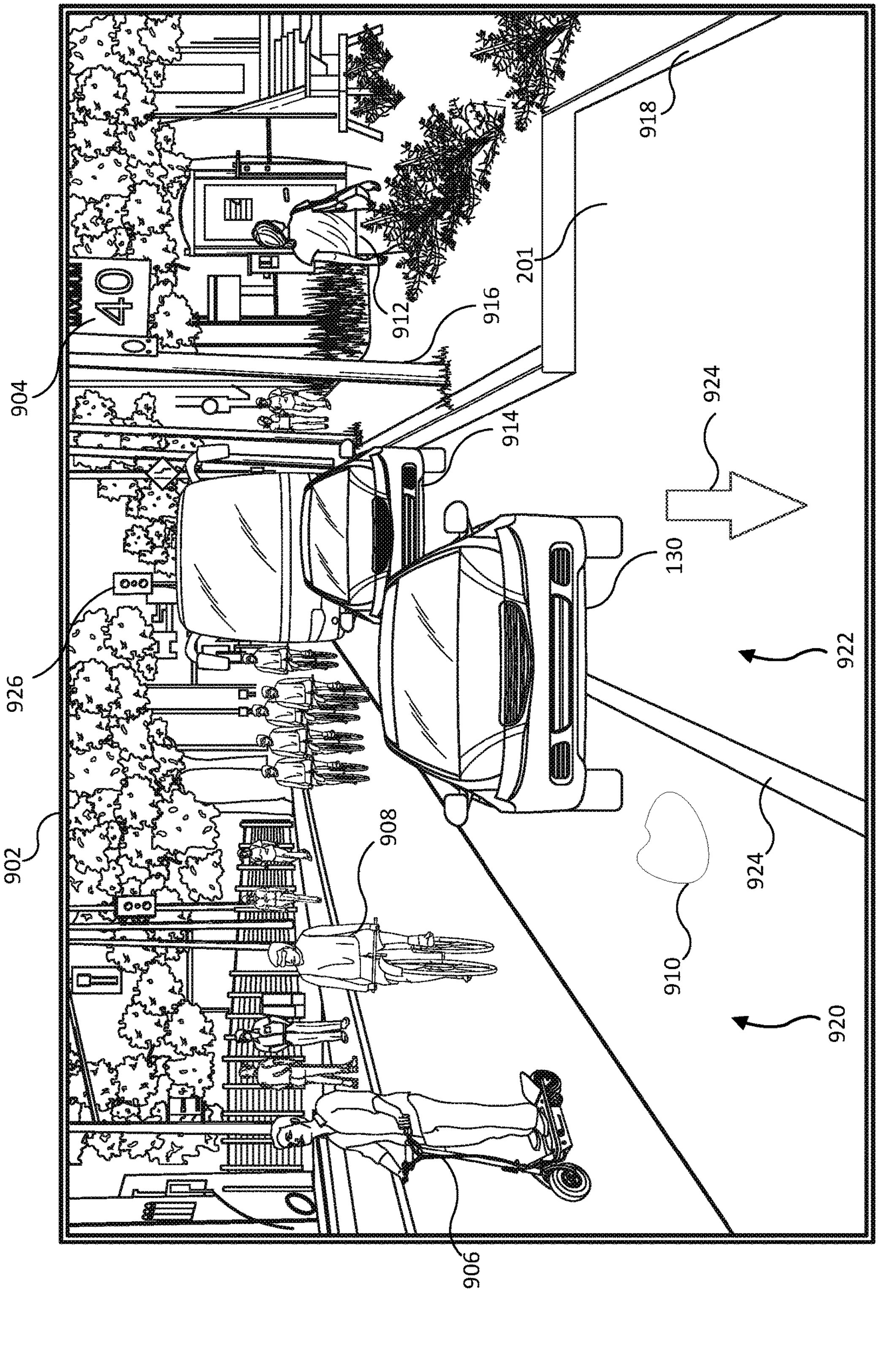
FIG. 9 is an illustration of an environment for route training of autonomous transportation provider vehicles.

FIG. 9 is an illustration of an environment for route training of autonomous transportation provider vehicles. FIG. 9 shows environment 902 in which autonomous transportation provider vehicles may provide transportation services. In some examples, environment 902 may be an urban environment in which autonomous transportation provider vehicles may need to navigate among multiple objects and conditions in order to provide transportation services. Autonomous transportation provider vehicle 130 may include a control system to control autonomous operation of the vehicle. The control system may have a learning module that learns methods of travel and navigation within geographic zones through route training. Environment 902 may be located within a geographic zone that autonomous transportation provider vehicle 130 is route training. Route training of autonomous transportation provider vehicle 130 may be performed by any suitable learning method (e.g., artificial intelligence, machine learning, image processing, neural networks, etc.). Further, according to embodiments of the present disclosure, route training of autonomous transportation provider vehicle 130 does not require autonomous transportation provider vehicle 130 to be trained on a particular route or trained using any particular method. In some examples, transportation provider vehicle 130 does not require any training to navigate within geographic zones and provide transportation services.

Referring to FIG. 9, autonomous transportation provider vehicle 130 may be trained to travel within lane 920 and/or lane 922. Autonomous transportation provider vehicle 130 may also be trained to change lanes from lane 920 to lane 922 and/or from lane 922 to lane 920. While traveling in lane 920, autonomous transportation provider vehicle 130 may be trained to detect (e.g., via image sensor and/or accelerometer) pothole 910 and learn to navigate past pothole 910. Environment 902 may include personal mobility vehicles 906 and/or 908. Autonomous transportation provider vehicle 130 may be trained to detect (e.g., via image sensor and/or near field communication) personal mobility vehicles 906 and/or 908 and learn to navigate past personal mobility vehicles 906 and/or 908. Environment 902 may include stationary objects such as signpost 916. Autonomous transportation provider vehicle 130 may be trained to detect (e.g., via image sensor and/or near field communication) signpost 916 and learn to navigate past signpost 916. Autonomous transportation provider vehicle 130 may be trained to detect (e.g., via image sensor and/or near field communication)

pedestrians including pedestrian 912 and learn to navigate past pedestrian 912. In some examples, pedestrian 912 may be a transportation requestor that has been matched to autonomous transportation provider vehicle 130 for transportation services in a geographic zone that includes environment 902. Pedestrian 912 may be a transportation requestor that has been matched to a transportation request designating pickup/drop-off location 201 as the pickup location for the transportation service. Autonomous transportation provider vehicle 130 may be trained to detect (e.g., via image sensor and/or near field communication) pickup/drop-off location 201 and navigate from lane 922 into pickup/drop-off location 201 and/or navigate out of pickup/drop-off location 201 into lane 922. Pickup/drop-off location 201 may include curb 918 for transitioning transportation requestors in and out of autonomous transportation provider vehicle 130. Curb 918 may be a smart curb and include sensors (e.g., proximity sensors) and/or communication capabilities (e.g., near-field wireless communications) to assist autonomous transportation provider vehicle 130 to enter and/or exit pickup/drop-off location 201. Environment 902 may include additional vehicles such as vehicle 914. Autonomous transportation provider vehicle 130 may be trained to detect (e.g., via sensors (image, ultrasonic, radar, lidar, etc.) and/or near field communication) vehicle 914 and learn to navigate within environment 902 while in proximity to vehicle 914.

Environment 902 may include traffic control devices including, without limitation, traffic signal 926, traffic speed control 904, lane divider 924, or a combination thereof. Autonomous transportation provider vehicle 130 may be trained to detect traffic signal 926, traffic speed control 904, and/or lane divider 924, based on, without limitation, sensors (e.g., image, ultrasonic, radar, lidar, etc.), wide area wireless, vehicle to vehicle communications, Internet of things, near field communication, or a combination thereof. Autonomous transportation provider vehicle 130 may be trained to adhere to the traffic control rules designated by traffic signal 926, traffic speed control 904 (e.g., maximum speed), and/or lane divider 924. In some examples, matching a transportation service request with autonomous transportation provider vehicle 130 within a geographic zone including environment 902 may be based at least in part on route training of autonomous transportation provider vehicle 130.

Figure 10:
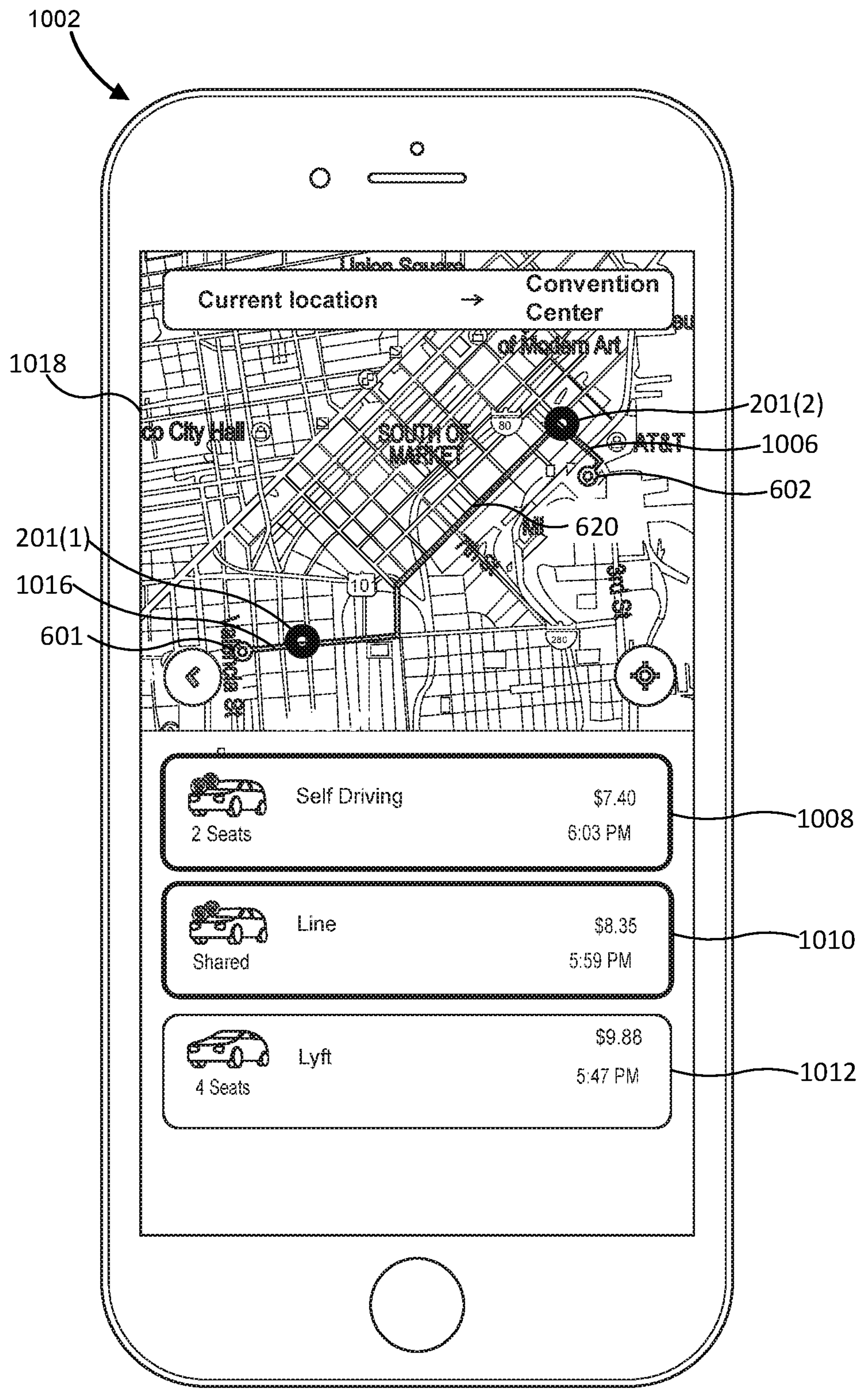
FIG. 10 is an illustration of an example method for providing a transportation service match to a transportation requestor device.

FIG. 10 is an illustration of an example method for providing a transportation service match to a transportation requestor device. A transportation management system may include a transportation requestor device (e.g., smartphone) to provide transportation requesting and matching information to a transportation requestor. Referring to FIG. 10, transportation requestor device 1002 may include an application for managing transportation services. Display screen 1018 may display information related to transportation services. Display screen may display a map of a geographic area overlaid with graphical information. In some examples, a transportation requestor may use the application to request transportation services. The application may display the transportation requestor's current location 601 and the transportation requestor may enter (e.g., text entry, voice entry, touchscreen entry) destination location 602. The transportation requestor may also enter characteristics of the transportation request including, without limitation, a number of passengers, a requested time for the transportation, a storage capacity required, or a combination thereof.

In response to the transportation request, the transportation management system may provide the transportation requestor with options for providing the transportation service. For example, an option for transportation using an autonomous transportation provider vehicle may be displayed in icon 1008, an option for transportation using shared transportation (e.g., shared with other transportation requestors) may be displayed in icon 1010, and/or an option for transportation using a human operated transportation provider vehicle may be displayed in icon 1012. Display screen 1018 may also display a route on the map associated with the options. A route associated with the option for transportation using an autonomous transportation provider vehicle may be displayed on the map and include current location 601, pickup location 201(1), route to pickup location 201(1) (e.g., walking route) 1016, autonomous transportation provider vehicle travel route 620, drop-off location 201(2), and route to destination 1006. A transportation requestor may choose the option by selecting (e.g., touching) the icon associated with the chosen option. In response to the transportation requestor choosing transportation using an autonomous transportation provider vehicle, display screen 1018 may display a more detailed map (e.g., zoomed in) surrounding current location 601 and route to pickup location 201(1) 1016.

In some examples, display screen 1018 may display a terms of service for acceptance by the transportation requestor prior to providing the transportation service. Display screen 1018 may also display a dynamic (e.g. continuously updated) walking guide for the transportation requestor to follow when traveling from current location 601 to pickup location 201(1) and/or from drop-off location 201(2) to destination 1006. Display screen 1018 may also display, without limitation, an estimated time of transportation requestor arrival to pickup location 201(1), an estimated time of autonomous transportation provider vehicle arrival to pickup location 201(1), an estimated time of autonomous transportation provider vehicle arrival to drop-off location 201(2), an estimated time of transportation requestor arrival to destination 602, an identifier of the autonomous transportation provider vehicle, an identifier of an operator of the autonomous transportation provider vehicle, a value associated with the transportation service, or a combination thereof.

In some examples, the application for managing transportation services running on transportation requestor device 1002 may provide an interface for the transportation requestor to control certain functions of the autonomous transportation provider vehicle during the transportation service. In some examples, the autonomous transportation provider vehicle may have an application interface device (e.g., smart screen) within the vehicle to control certain functions. The application may require authentication of the transportation requestor before allowing access to control functions. For example, the application interface may allow the transportation requestor to control, without limitation, a lock/unlock feature of the vehicle, entertainment (e.g., music, video, etc.), cabin temperature, trunk/storage access, shared ride access, communication to an operator (in-vehicle and/or remote operator), feedback associated with the service to the transportation management system, stopping of the vehicle (e.g., aborting the service), or a combination thereof. Control of the functions of the autonomous transportation provider vehicle during the transportation service may be based on a wireless interface (e.g., Bluetooth) between the vehicle and transportation requestor device 1002. In some examples, matching a transportation service request with an autonomous transportation provider vehicle within a geographic zone may be based on a transportation requestor entering and/or receiving information associated with the transportation request on a computing device.

In one example, a computer-implemented method may include determining one or more characteristics of an autonomous vehicle. In some examples, the method may further include determining one or more characteristics of one or more road segments of a geographic area. In some examples, the method may further include determining at least one geographic zone for the autonomous vehicle within the geographic area based at least on the characteristics of the autonomous vehicle and the characteristics of the one or more road segments of the geographic area. In some examples, the method may further include matching a request with the autonomous vehicle within the at least one geographic zone based at least in part on a request location and a destination location of the request being associated with the at least one geographic zone.

In some examples, the method may further include determining characteristics of a transportation requestor. In some examples, matching the request with the autonomous vehicle within the at least one geographic zone may be based at least on the characteristics of the transportation requestor, the characteristics of the autonomous vehicle, and the characteristics of the one or more road segments of the geographic area.

In some examples, the characteristics of the transportation requestor may include at least one of an acceptance of terms of service associated with the transportation requestor, a distance of the transportation requestor to a pickup location associated with the transportation service request, and a distance of a drop-off location to a destination associated with the transportation service request. In some examples, the transportation requestor may be provided transportation services in response to the pickup location being different than a location of the transportation requestor or the drop-off location being different from a destination of the transportation requestor.

In some examples, the method may further include determining one or more characteristics of a second autonomous vehicle and determining a second geographic zone for the second autonomous vehicle within the geographic area may be based at least on the characteristics of the second autonomous vehicle and the characteristics of the one or more road segments of the geographic area.

In some examples, the one or more characteristics of the autonomous vehicle may be based at least on capabilities of the autonomous vehicle associated with providing the transportation services within the at least one geographic zone.

In some examples, the capabilities of the autonomous vehicle may include at least one of a capability of driving on road segments, a capability to pickup transportation requestors at pickup locations, a capability to drop off transportation requestors at drop-off locations, and a capability to perform certain driving maneuvers.

In some examples, the method may further include comparing the one or more characteristics of the autonomous vehicle with the characteristics of the one or more road segments of the geographic area. In some examples, determining the at least one geographic zone within the geographic area may be further based on the comparison of the one or more characteristics of the autonomous vehicle with the characteristics of the one or more road segments of the geographic area.

In some examples, determining the at least one geographic zone may be based on at least one of one or more road segments where the autonomous vehicle is trained to operate in the at least one geographic zone, identifying a pick-up location compatible with the characteristics of the autonomous vehicle, and identifying a drop-off location compatible with the characteristics of the autonomous vehicle.

In some examples, matching the request with the autonomous vehicle within the at least one geographic zone may be further based on characteristics of the request and the characteristics of the request may include at least one of a value associated with the request, a pickup location of the request, a drop-off location of the request, a number of passengers associated with the request, and a time of day associated with the request.

In some examples, the characteristics of the autonomous vehicle may include at least one of a training level of the autonomous vehicle associated with the geographic zone and a training level of a monitoring operator associated with the autonomous vehicle.

In some examples, the characteristics of the autonomous vehicle may include at least one of a capability level of the autonomous vehicle to perform driving maneuvers, a capability level of the autonomous vehicle to traverse routes within the geographic zone, an authorization level of the autonomous vehicle to traverse routes within the geographic zone, and a level of access to capability data associated with the autonomous vehicle.

In some examples, the characteristics of the one or more road segments of the geographic area may include at least one of a route of travel within the geographic area, a weather condition within the geographic area, a density of vehicle traffic within the geographic area, a density of pedestrian traffic within the geographic area, and a condition of traffic control devices within the geographic area.

In some examples, the method may further include normalizing data formats of characteristics of two or more different autonomous vehicles. In some examples, matching the transportation service request with the autonomous vehicle within the geographic zone may be based at least on the normalized data formats of the characteristics of the two or more different autonomous vehicles.

In one example, a system may include one or more physical processors and one or more memories coupled to one or more of the physical processors, the one or more memories comprising instructions operable when executed by the one or more physical processors to cause the system to perform operations including determining one or more characteristics of an autonomous vehicle, determining one or more characteristics of one or more road segments of a geographic area, determining at least one geographic zone for the autonomous vehicle within the geographic area based at least on the characteristics of the autonomous vehicle and the characteristics of the one or more road segments of the geographic area, and matching a request with the autonomous vehicle within the at least one geographic zone based at least in part on a request location and a destination location of the request being associated with the at least one geographic zone.

In some examples, the operations may further include determining characteristics of a transportation requestor. In some examples, matching the request with the autonomous vehicle within the at least one geographic zone may be based at least on the characteristics of the transportation requestor, the characteristics of the autonomous vehicle, and the characteristics of the one or more road segments of the geographic area.

In some examples, the characteristics of the transportation requestor may include at least one of an acceptance of terms of service associated with the transportation requestor, a distance of the transportation requestor to a pickup location associated with the transportation service request, and a distance of a drop-off location to a destination associated with the transportation service request. In some examples, the transportation requestor may be provided transportation services when the pickup location is different than a location of the transportation requestor or the drop-off location is different from a destination of the transportation requestor In some examples, the one or more characteristics of the autonomous vehicle may be based at least on capabilities of the autonomous vehicle associated with providing the transportation services within the at least one geographic zone and the capabilities of the autonomous vehicle may include a capability of driving on road segments, a capability to pickup transportation requestors at pickup locations, and a capability to drop off transportation requestors at drop-off locations.

In some examples, the operations may further include comparing the one or more characteristics of the autonomous vehicle with the characteristics of the one or more road segments of the geographic area. In some examples, determining the at least one geographic zone within the geographic area is further based on the comparison of the one or more characteristics of the autonomous vehicle with the characteristics of the one or more road segments of the geographic area.

In some examples, determining the at least one geographic zone may be based on at least one of determining whether the autonomous vehicle is trained for travel in the at least one geographic zone, identifying a pick-up location compatible with the characteristics of the autonomous vehicle, and identifying a drop-off location compatible with the characteristics of the autonomous vehicle.

In one example, a non-transitory computer-readable storage medium may include computer-readable instructions that, when executed by at least one processor of a computing device, cause the computing device to determine one or more characteristics of an autonomous vehicle, determine one or more characteristics of one or more road segments of a geographic area, determine at least one geographic zone for the autonomous vehicle within the geographic area based at least on the characteristics of the autonomous vehicle and the characteristics of the one or more road segments of the at least one geographic area, and match a request with the autonomous vehicle within the at least one geographic zone based at least in part on a request location and a destination location of the request being associated with the at least one geographic zone.

Figure 11:
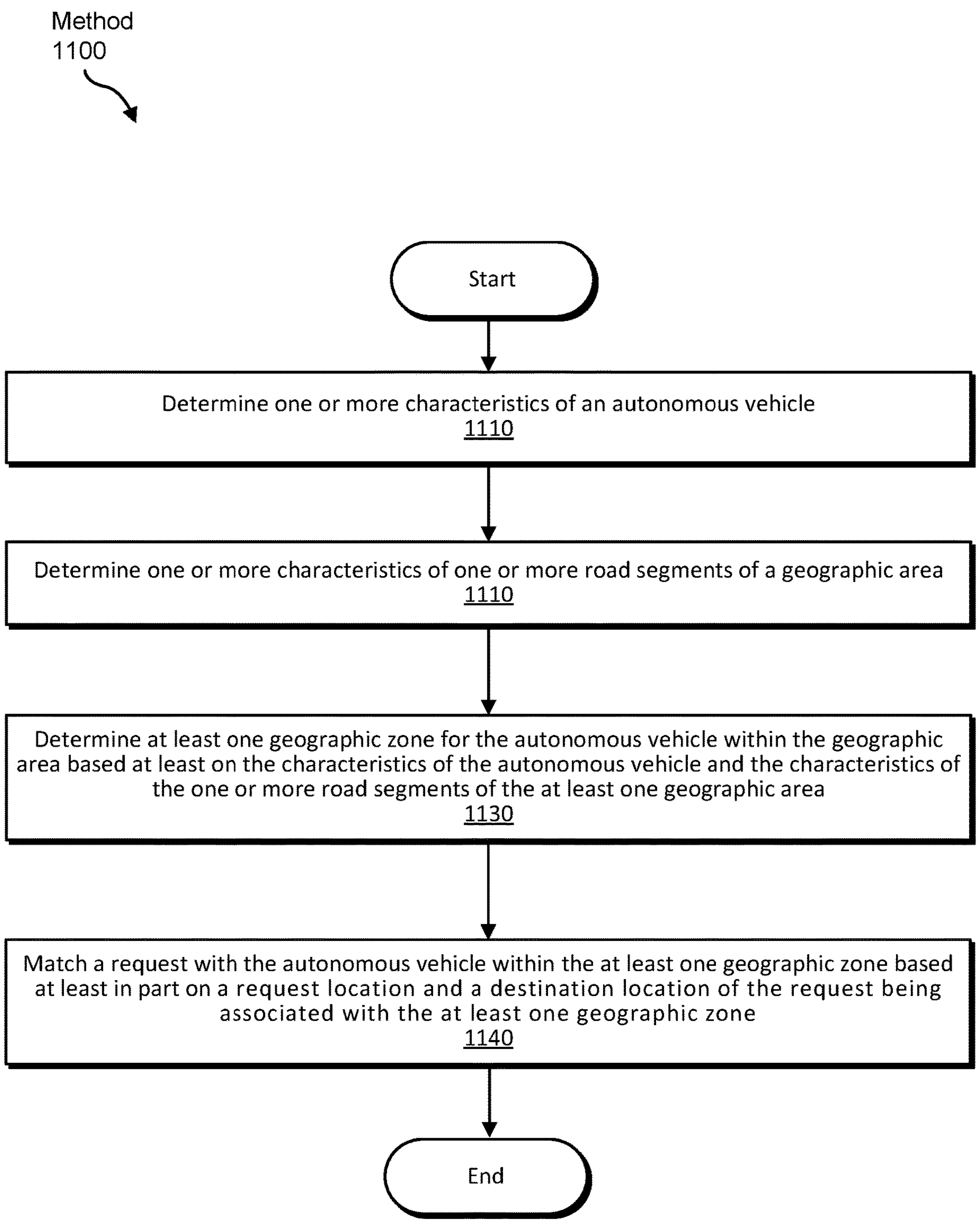
FIG. 11 is a flow diagram of an example method for matching an autonomous transportation provider vehicle and a transportation request in a transportation management system.

FIG. 11 is a flow diagram of an example method 1100 for matching autonomous vehicles and transportation requests in a transportation management system. As shown in FIG. 11, the method may include, at step 1110, determining one or more characteristics of an autonomous vehicle. At step 1120, the method may include determining one or more characteristics of one or more road segments of a geographic area. At step 1130, the method may include determining at least one geographic zone for the autonomous vehicle within the geographic area based at least on the characteristics of the autonomous vehicle and the characteristics of the one or more road segments of the at least one geographic area. At step 1140, the method may include matching a request with the autonomous vehicle within the at least one geographic zone based at least in part on a request location and a destination location of the request being associated with the at least one geographic zone.

Embodiments of the instant disclosure may include or be implemented in conjunction with a transportation management system. A transportation management system may arrange rides on an on-demand and/or ad-hoc basis by, e.g., matching one or more ride requestors with one or more ride providers. For example, a transportation management system may provide one or more transportation matching services for a ridesharing service, a ridesourcing service, a taxicab service, a car-booking service, an autonomous vehicle service, or some combination and/or derivative thereof. The transportation management system may include and/or interface with any of a variety of subsystems that may implement, support, and/or improve a transportation matching service. For example, the transportation management system may include a matching system (e.g., that matches requestors to ride opportunities and/or that arranges for requestors and/or providers to meet), a mapping system, a navigation system (e.g., to help a provider reach a requestor, to help a requestor reach a provider, and/or to help a provider reach a destination), a reputation system (e.g., to rate and/or gauge the trustworthiness of a requestor and/or a provider), a payment system, and/or an autonomous or semi-autonomous driving system. The transportation management system may be implemented on various platforms, including a requestor-owned mobile device, a computing system installed in a vehicle, a requestor-owned mobile device, a server computer system, or any other hardware platform capable of providing transportation matching services to one or more requestors and/or providers.

Figure 12:
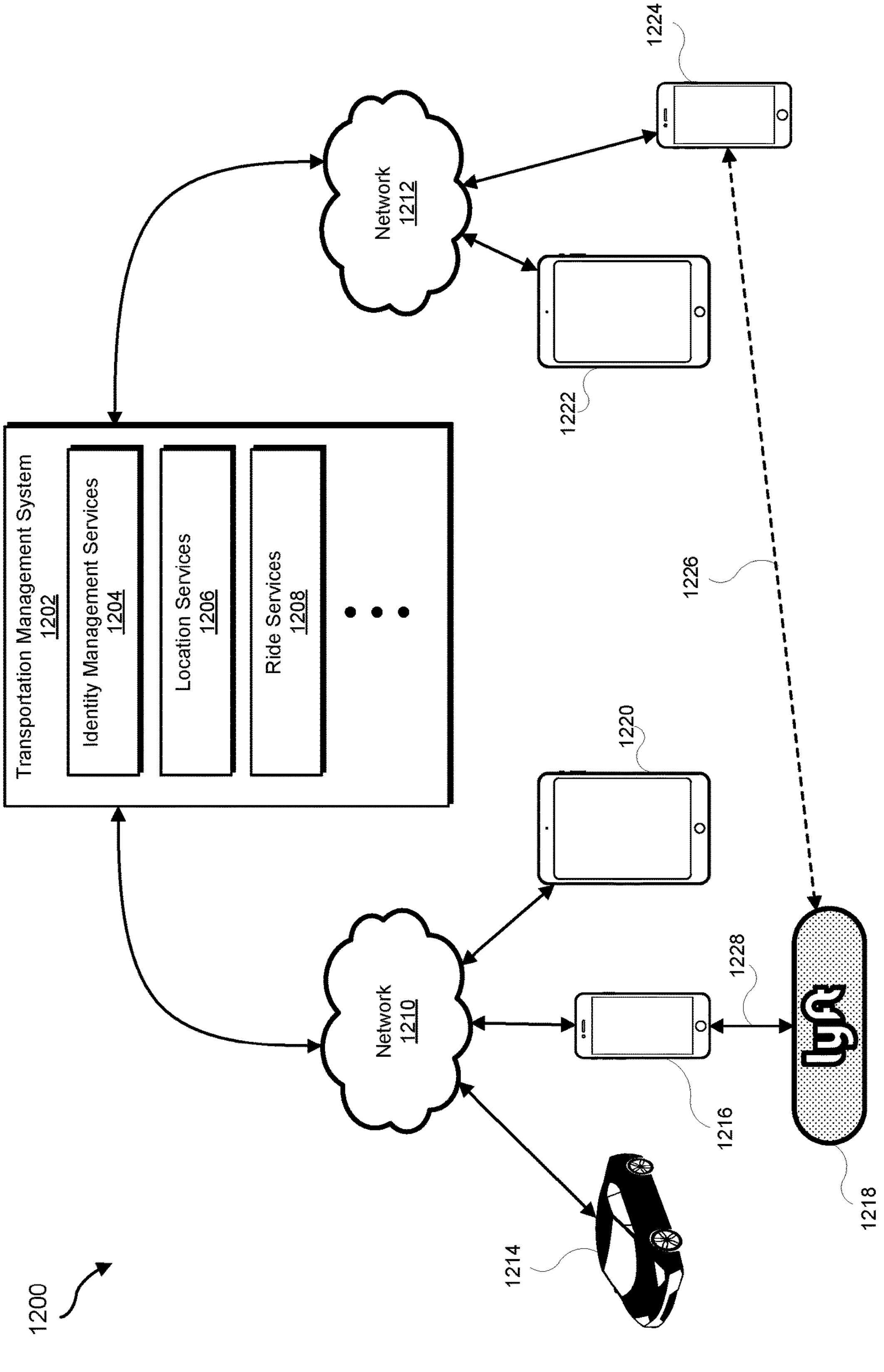
FIG. 12 is an illustration of an example transportation requestor/transportation provider management environment.

FIG. 12 shows a transportation management environment 1200, in accordance with various embodiments. As shown in FIG. 12, a transportation management system 1202 may run one or more services and/or software applications, including identity management services 1204, location services 1206, ride services 1208, and/or other services. Although FIG. 12 shows a certain number of services provided by transportation management system 1202, more or fewer services may be provided in various implementations. In addition, although FIG. 12 shows these services as being provided by transportation management system 1202, all or a portion of any of the services may be processed in a distributed fashion. For example, computations associated with a service task may be performed by a combination of transportation management system 1202 (including any number of servers, databases, etc.), one or more devices associated with a provider (e.g., devices integrated with managed vehicles 1214, provider's computing devices 1216 and tablets 1220, and transportation management vehicle devices 1218), and/or more or more devices associated with a ride requestor (e.g., the requestor's computing devices 1224 and tablets 1222). In some embodiments, transportation management system 1202 may include one or more general purpose computers, server computers, clustered computing systems, cloud-based computing systems, and/or any other computing systems or arrangements of computing systems. Transportation management system 1202 may be configured to run any or all of the services and/or software components described herein. In some embodiments, the transportation management system 1202 may include an appropriate operating system and/or various server applications, such as web servers capable of handling hypertext transport protocol (HTTP) requests, file transfer protocol (FTP) servers, database servers, etc.

In some embodiments, identity management services 1204 may be configured to perform authorization services for requestors and providers and/or manage their interactions and/or data with transportation management system 1202. This may include, e.g., authenticating the identity of providers and determining that they are authorized to provide services through transportation management system 1202. Similarly, requestors' identities may be authenticated to determine whether they are authorized to receive the requested services through transportation management system 1202. Identity management services 1204 may also manage and/or control access to provider and/or requestor data maintained by transportation management system 1202, such as driving and/or ride histories, vehicle data, personal data, preferences, usage patterns as a ride provider and/or as a ride requestor, profile pictures, linked third-party accounts (e.g., credentials for music and/or entertainment services, social-networking systems, calendar systems, task-management systems, etc.) and any other associated information. Transportation management system 1202 may also manage and/or control access to provider and/or requestor data stored with and/or obtained from third-party systems. For example, a requester or provider may grant access to a third-party email, calendar, or task management system (e.g., via the user's credentials). As another example, a requestor or provider may grant, through a mobile device (e.g., 1216, 1220, 1222, or 1224), a transportation application associated with transportation management system 1202 access to data provided by other applications installed on the mobile device. In some examples, such data may be processed on the client and/or uploaded to transportation management system 1202 for processing.

In some embodiments, transportation management system 1202 may provide ride services 1208, which may include ride matching and/or management services to connect a requestor to a provider. For example, after identity management services module 1204 has authenticated the identity a ride requestor, ride services module 1208 may attempt to match the requestor with one or more ride providers. In some embodiments, ride services module 1208 may identify an appropriate provider using location data obtained from location services module 1206. Ride services module 1208 may use the location data to identify providers who are geographically close to the requestor (e.g., within a certain threshold distance or travel time) and/or who are otherwise a good match with the requestor. Ride services module 1208 may implement matching algorithms that score providers based on, e.g., preferences of providers and requestors; vehicle features, amenities, condition, and/or status; providers' preferred general travel direction and/or route, range of travel, and/or availability; requestors' origination and destination locations, time constraints, and/or vehicle feature needs; and any other pertinent information for matching requestors with providers. In some embodiments, ride services module 1208 may use rule-based algorithms and/or machine-learning models for matching requestors and providers.

Transportation management system 1202 may communicatively connect to various devices through networks 1210 and/or 1212. Networks 1210 and 1212 may include any combination of interconnected networks configured to send and/or receive data communications using various communication protocols and transmission technologies. In some embodiments, networks 1210 and/or 1212 may include local region networks (LANs), wide-region networks (WANs), and/or the Internet, and may support communication protocols such as transmission control protocol/Internet protocol (TCP/IP), Internet packet exchange (IPX), systems network architecture (SNA), and/or any other suitable network protocols. In some embodiments, data may be transmitted through networks 1210 and/or 1212 using a mobile network (such as a mobile telephone network, cellular network, satellite network, or other mobile network), a public switched telephone network (PSTN), wired communication protocols (e.g., Universal Serial Bus (USB), Controller Region Network (CAN)), and/or wireless communication protocols (e.g., wireless LAN (WLAN) technologies implementing the IEEE 802.11 family of standards, Bluetooth, Bluetooth Low Energy, Near Field Communication (NFC), Z-Wave, and ZigBee). In various embodiments, networks 1210 and/or 1212 may include any combination of networks described herein or any other type of network capable of facilitating communication across networks 1210 and/or 1212.

In some embodiments, transportation management vehicle device 1218 may include a provider communication device configured to communicate with users, such as drivers, passengers, pedestrians, and/or other users. In some embodiments, transportation management vehicle device 1218 may communicate directly with transportation management system 1202 or through another provider computing device, such as provider computing device 1216. In some embodiments, a requestor computing device (e.g., device 1224) may communicate via a connection 1226 directly with transportation management vehicle device 1218 via a communication channel and/or connection, such as a peer-to-peer connection, Bluetooth connection, NFC connection, ad hoc wireless network, and/or any other communication channel or connection. Although FIG. 12 shows particular devices communicating with transportation management system 1202 over networks 1210 and 1212, in various embodiments, transportation management system 1202 may expose an interface, such as an application programming interface (API) or service provider interface (SPI) to enable various third parties which may serve as an intermediary between end users and transportation management system 1202.

In some embodiments, devices within a vehicle may be interconnected. For example, any combination of the following may be communicatively connected: vehicle 1214, provider computing device 1216, provider tablet 1220, transportation management vehicle device 1218, requestor computing device 1224, requestor tablet 1222, and any other device (e.g., smart watch, smart tags, etc.). For example, transportation management vehicle device 1218 may be communicatively connected to provider computing device 1216 and/or requestor computing device 1224. Transportation management vehicle device 1218 may establish communicative connections, such as connections 1226 and 1228, to those devices via any suitable communication technology, including, e.g., WLAN technologies implementing the IEEE 802.11 family of standards, Bluetooth, Bluetooth Low Energy, NFC, Z-Wave, ZigBee, and any other suitable short-range wireless communication technology.

In some embodiments, users may utilize and interface with one or more services provided by the transportation management system 1202 using applications executing on their respective computing devices (e.g., 1216, 1218, 1220, and/or a computing device integrated within vehicle 1214), which may include mobile devices (e.g., an iPhone®, an iPad®, mobile telephone, tablet computer, a personal digital assistant (PDA)), laptops, wearable devices (e.g., smart watch, smart glasses, head mounted displays, etc.), thin client devices, gaming consoles, and any other computing devices. In some embodiments, vehicle 1214 may include a vehicle-integrated computing device, such as a vehicle navigation system, or other computing device integrated with the vehicle itself, such as the management system of an autonomous vehicle. The computing device may run on any suitable operating systems, such as Android®, iOS®, macOS®, Windows®, Linux®, UNIX®, or UNIX®-based or Linux®-based operating systems, or other operating systems. The computing device may further be configured to send and receive data over the Internet, short message service (SMS), email, and various other messaging applications and/or communication protocols. In some embodiments, one or more software applications may be installed on the computing device of a provider or requestor, including an application associated with transportation management system 1202. The transportation application may, for example, be distributed by an entity associated with the transportation management system via any distribution channel, such as an online source from which applications may be downloaded. Additional third-party applications unassociated with the transportation management system may also be installed on the computing device. In some embodiments, the transportation application may communicate or share data and resources with one or more of the installed third-party applications.

Figure 13:
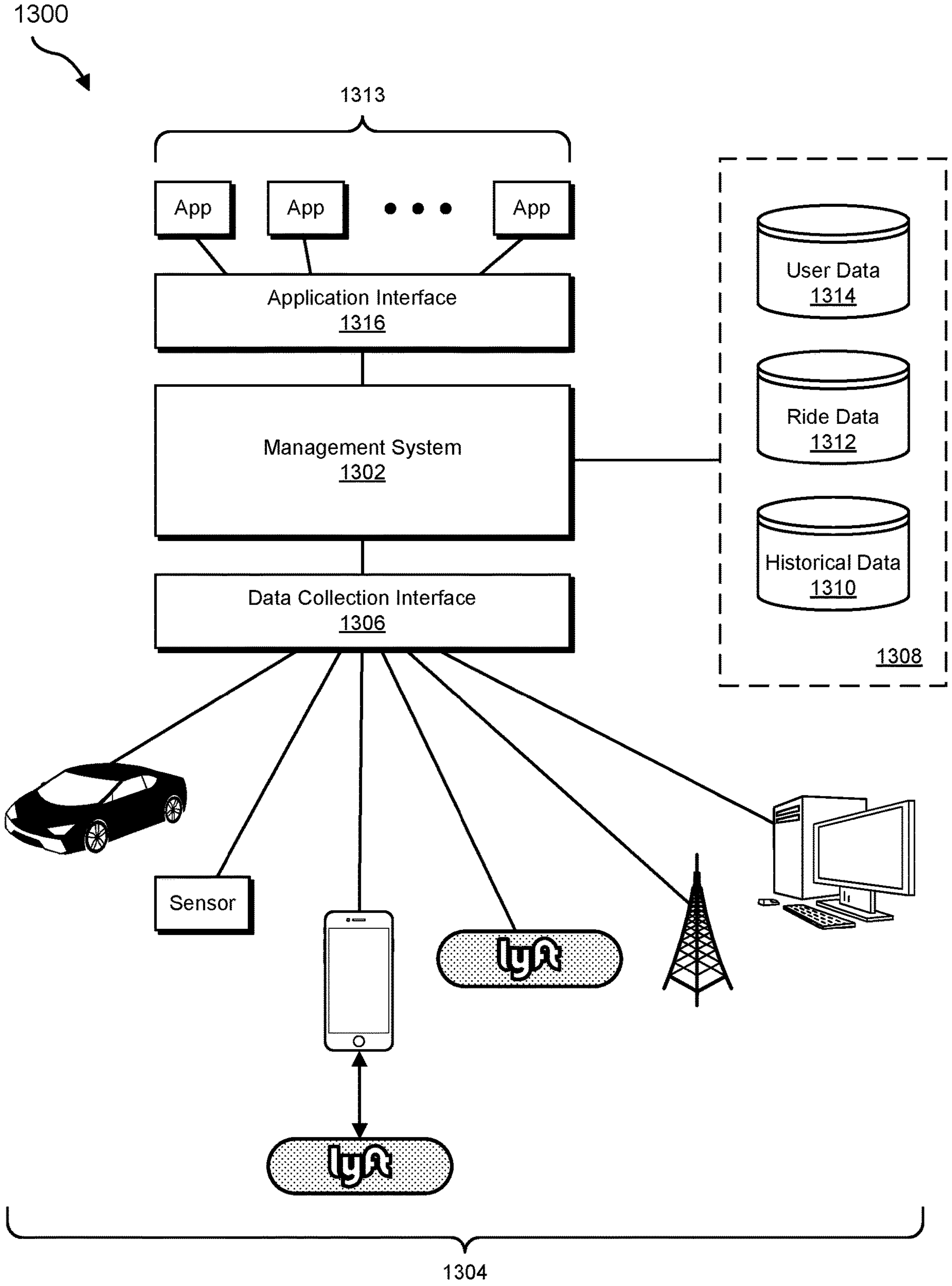
FIG. 13 is an illustration of an example data collection and application management system.

FIG. 13 shows a data collection and application management environment 1300, in accordance with various embodiments. As shown in FIG. 13, management system 1302 may be configured to collect data from various data collection devices 1304 through a data collection interface 1306. As discussed above, management system 1302 may include one or more computers and/or servers or any combination thereof. Data collection devices 1304 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1306 can include, e.g., an extensible device framework configured to support interfaces for each data collection device. In various embodiments, data collection interface 1306 may be extended to support new data collection devices as they are released and/or to update existing interfaces to support changes to existing data collection devices. In various embodiments, data collection devices may communicate with data collection interface 1306 over one or more networks. The networks may include any network or communication protocol as would be recognized by one of ordinary skill in the art, including those networks discussed above.

As shown in FIG. 13, data received from data collection devices 1304 can be stored in data store 1308. Data store 1308 may include one or more data stores, such as databases, object storage systems and services, cloud-based storage services, and other data stores. For example, various data stores may be implemented on a non-transitory storage medium accessible to management system 1302, such as historical data store 1310, ride data store 1312, and user data store 1314. Data stores 1308 can be local to management system 1302, or remote and accessible over a network, such as those networks discussed above or a storage-region network or other networked storage system. In various embodiments, historical data 1310 may include historical traffic data, weather data, request data, road condition data, or any other data for a given region or regions received from various data collection devices. Ride data 1312 may include route data, request data, timing data, and other ride related data, in aggregate and/or by requestor or provider. User data 1314 may include user account data, preferences, location history, and other user-specific data. Although certain data stores are shown by way of example, any data collected and/or stored according to the various embodiments described herein may be stored in data stores 1308.

As shown in FIG. 13, an application interface 1316 can be provided by management system 1302 to enable various apps 1318 to access data and/or services available through management system 1302. Apps 1318 may run on various user devices (including provider and requestor computing devices, such as those discussed above) and/or may include cloud-based or other distributed apps configured to run across various devices (e.g., computers, servers, or combinations thereof). Apps 1318 may include, e.g., aggregation and/or reporting apps which may utilize data 1308 to provide various services (e.g., third-party ride request and management apps). In various embodiments, application interface 1316 can include an API and/or SPI enabling third party development of apps 1318. In some embodiments, application interface 1316 may include a web interface, enabling web-based access to data 1308 and/or services provided by management system 1302. In various embodiments, apps 1318 may run on devices configured to communicate with application interface 1316 over one or more networks. The networks may include any network or communication protocol as would be recognized by one of ordinary skill in the art, including those networks discussed above, in accordance with an embodiment of the present disclosure.

While various embodiments of the present disclosure are described in terms of a ridesharing service in which the ride providers are human drivers operating their own vehicles, in other embodiments, the techniques described herein may also be used in environments in which ride requests are fulfilled using autonomous vehicles. For example, a transportation management system of a ridesharing service may facilitate the fulfillment of ride requests using both human drivers and autonomous vehicles.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:

receiving, by a transportation management system from a transportation requestor device, a transportation request comprising at least a pickup location and a drop-off location;

determining, by the transportation management system, that the pickup location and the drop-off location are situated within at least one geographic zone in which an autonomous vehicle and at least one other autonomous vehicle are authorized to provide transportation services, wherein:

the autonomous vehicle and the at least one other autonomous vehicle are trained to travel to at least one of the pickup location or the drop-off location such that driving maneuvers performed by the autonomous vehicle are based on the training level of the autonomous vehicle; and at least one of the pickup location or the drop-off location is determined based on the training level of the autonomous vehicle;

determining, by the transportation management system, that the autonomous vehicle and the at least one other autonomous vehicle have different authorization levels to traverse at least one route within the at least one geographic zone, wherein an authorization level comprises a regulatory restriction updated by a government authority;

matching, by the transportation management system, the transportation request with the autonomous vehicle based on a first authorization level of the autonomous vehicle and a second authorization level of the at least one other autonomous vehicle to traverse the at least one route, wherein the first authorization level indicates that the at least one of the pickup location or the drop-off location is traversable by the autonomous vehicle based on a regulatory restriction and the training level of the autonomous vehicle to perform driving maneuvers to the pickup location or the drop-off location and wherein the second authorization level indicates that the at least one of the pickup location or the drop-off location is non-traversable by the at least one other autonomous vehicle based on a regulatory restriction and a training level of the at least one other autonomous vehicle to perform driving maneuvers to the pickup location or the drop-off location; and instructing, by the transportation management system, the autonomous vehicle to travel to the pickup location of the transportation request along the at least one route, such that the matching improves an efficiency of the autonomous vehicle and an efficiency of the transportation management system.

2. The method of claim 1, further comprising determining that the autonomous vehicle and the at least one other autonomous vehicle are authorized to provide transportation services in the at least one geographic zone by:

identifying one or more characteristics of the autonomous vehicle and one or more characteristics of the at least one other autonomous vehicle;

identifying one or more respective characteristics of one or more respective road segments of the at least one geographic zone; and determining that the autonomous vehicle and the at least one other autonomous vehicle are authorized to provide transportation services within the at least one geographic zone based on the one or more characteristics of the autonomous vehicle, the one or more characteristics of the at least one other autonomous vehicle, and the one or more characteristics of the one or more road segments of the at least one geographic zone.

3. The method of claim 2, wherein the one or more characteristics of the autonomous vehicle and the one or more characteristics of the at least one other autonomous vehicle are based at least on one or more capabilities of the autonomous vehicle and one or more capabilities of the at least one other autonomous vehicle associated with providing transportation services within the at least one geographic zone.

4. The method of claim 3, wherein the one or more capabilities of the autonomous vehicle and the one or more capabilities of the at least one other autonomous vehicle include at least one of:

a capability of driving on the one or more road segments of the at least one geographic zone;

a capability to pick up transportation requestors at pickup locations;

a capability to drop off transportation requestors at drop-off locations; or a capability to perform specified driving maneuvers.

5. The method of claim 3, wherein determining that the autonomous vehicle and the at least one other autonomous vehicle have different authorization levels to traverse the at least one route within the at least one geographic zone comprises determining that the autonomous vehicle and the at least one other autonomous vehicle have different capabilities, wherein the different capabilities indicate that at least one of:

the pickup location is accessible to the autonomous vehicle and is inaccessible to the at least one other autonomous vehicle; or the drop-off location is accessible to the autonomous vehicle and is inaccessible to the at least one other autonomous vehicle.

6. The method of claim 2, wherein determining that the pickup location and the drop-off location are situated within the at least one geographic zone comprises determining that the pickup location and the drop-off location are compatible with the one or more characteristics of the autonomous vehicle and the one or more characteristics of the at least one other autonomous vehicle.

7. The method of claim 2, wherein the one or more characteristics of the autonomous vehicle and the one or more characteristics of the at least one other autonomous vehicle include at least one of:

a capability level to perform driving maneuvers;

a capability level to traverse the at least one route within the at least one geographic zone;

the first authorization level to traverse the at least one route within the at least one geographic zone;

the second authorization level to traverse the at least one route within the at least one geographic zone; or a level of access to capability data associated with the autonomous vehicle or the at least one other autonomous vehicle, and wherein the level of access to capability data is determined by a manufacturer of the autonomous vehicle or by a manufacturer of the at least one other autonomous vehicle.

8. The method of claim 2, wherein the one or more characteristics of the one or more road segments of the at least one geographic zone include at least one of:

a route of travel within the at least one geographic zone;

a weather condition within the at least one geographic zone;

a density of vehicle traffic within the at least one geographic zone;

a density of pedestrian traffic within the at least one geographic zone; or a condition of traffic control devices within the at least one geographic zone.

9. The method of claim 2, wherein determining that the autonomous vehicle and the at least one other autonomous vehicle are authorized to provide transportation services in the at least one geographic zone comprises determining that the at least one geographic zone is accessible to a type of vehicle of the autonomous vehicle and a type of vehicle of the at least one other autonomous vehicle.

10. The method of claim 2, wherein matching the transportation request with the autonomous vehicle is further based on comparing the one or more characteristics of the autonomous vehicle and the one or more characteristics of the at least one other autonomous vehicle.

11. The method of claim 1, wherein:

matching the transportation request with the autonomous vehicle is further based on a characteristic of the transportation request; and the characteristic of the transportation request includes at least one of:

a value associated with the transportation request;

the pickup location of the transportation request;

the drop-off location of the transportation request;

a number of passengers associated with the transportation request; or a time of day associated with the transportation request.

12. The method of claim 1, wherein instructing the autonomous vehicle to travel to the pickup location of the transportation request comprises electronically transmitting at least one of:

the transportation request;

the pickup location;

the drop-off location; or the at least one route that the autonomous vehicle is authorized to traverse.

13. A transportation management system comprising one or more physical processors and one or more memories in communication with the one or more physical processors, the one or more memories comprising instructions operable when executed by the one or more physical processors to cause the system to perform operations comprising:

receiving, by a transportation management system from a transportation requestor device, a transportation request comprising at least a pickup location and a drop-off location;

determining, by the transportation management system, that the pickup location and the drop-off location are situated within at least one geographic zone in which an autonomous vehicle and at least one other autonomous vehicle are authorized to provide transportation services, wherein:

the autonomous vehicle and the at least one other autonomous vehicle are trained to travel to at least one of the pickup location or the drop-off location such that driving maneuvers performed by the autonomous vehicle are based on the training level of the autonomous vehicle; and at least one of the pickup location or the drop-off location is determined based on the training level of the autonomous vehicle;

determining, by the transportation management system, that the autonomous vehicle and the at least one other autonomous vehicle have different authorization levels to traverse at least one route within the at least one geographic zone, wherein an authorization level comprises a regulatory restriction updated by a government authority;

matching, by the transportation management system, the transportation request with the autonomous vehicle based on a first authorization level of the autonomous vehicle and a second authorization level of the at least one other autonomous vehicle to traverse the at least one route, wherein the first authorization level indicates that the at least one of the pickup location or the drop-off location is traversable by the autonomous vehicle based on a regulatory restriction and the training level of the autonomous vehicle to perform driving maneuvers to the pickup location or the drop-off location and wherein the second authorization level indicates that the at least one of the pickup location or the drop-off location is non-traversable by the at least one other autonomous vehicle based on a regulatory restriction and a training level of the at least one other autonomous vehicle to perform driving maneuvers to the pickup location or the drop-off location; and instructing, by the transportation management system, the autonomous vehicle to travel to the pickup location of the transportation request along the at least one route, such that the matching improves an efficiency of the autonomous vehicle and an efficiency of the transportation management system.

14. The transportation management system of claim 13, wherein the one or more physical processors further cause the transportation management system to perform operations comprising determining that the autonomous vehicle and the at least one other autonomous vehicle are authorized to provide transportation services in the at least one geographic zone by:

identifying one or more characteristics of the autonomous vehicle and one or more characteristics of the at least one other autonomous vehicle;

identifying one or more respective characteristics of one or more respective road segments of the at least one geographic zone; and determining that the autonomous vehicle and the at least one other autonomous vehicle are authorized to provide transportation services within the at least one geographic zone based on the one or more characteristics of the autonomous vehicle, the one or more characteristics of the at least one other autonomous vehicle, and the one or more characteristics of the one or more road segments of the at least one geographic zone.

15. The transportation management system of claim 14, wherein the one or more physical processors further cause the transportation management system to perform operations comprising comparing the one or more characteristics of the autonomous vehicle with the one or more characteristics of the one or more road segments of the at least one geographic zone, wherein determining that the autonomous vehicle is capable of navigating within the geographic zone is based on a comparison of the one or more characteristics of the autonomous vehicle with the one or more characteristics of the one or more road segments of the geographic zone.

16. The transportation management system of claim 14, wherein the one or more characteristics of the autonomous vehicle and the one or more characteristics of the at least one other autonomous vehicle are based at least on one or more capabilities of the autonomous vehicle and one or more capabilities of the at least one other autonomous vehicle associated with providing transportation services within the at least one geographic zone.

17. The transportation management system of claim 16, wherein determining that the autonomous vehicle and the at least one other autonomous vehicle have different authorization levels to traverse the at least one route within the at least one geographic zone comprises determining that the autonomous vehicle and the at least one other autonomous vehicle have different capabilities, wherein the different capabilities indicate that at least one of:

the pickup location is accessible to the autonomous vehicle and is inaccessible to the at least one other autonomous vehicle; or the drop-off location is accessible to the autonomous vehicle and is inaccessible to the at least one other autonomous vehicle.

18. The transportation management system of claim 14, wherein the one or more characteristics of the autonomous vehicle and the one or more characteristics of the at least one other autonomous vehicle include a level of access the transportation management system has to capability data associated with the autonomous vehicle or the at least one other autonomous vehicle, and wherein determining that the autonomous vehicle or the at least one other autonomous vehicle is authorized to provide transportation services in the at least one geographic zone is based on the level of access to capability data.

19. The transportation management system of claim 13, wherein the one or more physical processors further cause the transportation management system to perform operations comprising:

matching the transportation request with the autonomous vehicle is further based on a characteristic of the transportation request; and the characteristic of the transportation request includes at least one of:

a value associated with the transportation request;

the pickup location of the transportation request;

the drop-off location of the transportation request;

a number of passengers associated with the transportation request; or a time of day associated with the transportation request.

20. A non-transitory computer-readable storage medium comprising computer-readable instructions that, when executed by at least one processor of a computing device, cause the computing device to:

receive, by a transportation management system from a transportation requestor device, a transportation request comprising at least a pickup location and a drop-off location;

determine, by the transportation management system, that the pickup location and the drop-off location are situated within at least one geographic zone in which an autonomous vehicle and at least one other autonomous vehicle are authorized to provide transportation services, wherein:

the autonomous vehicle and the at least one other autonomous vehicle are trained to travel to at least one of the pickup location or the drop-off location such that driving maneuvers performed by the autonomous vehicle are based on the training level of the autonomous vehicle; and at least one of the pickup location or the drop-off location is determined based on the training level of the autonomous vehicle;

determine, by the transportation management system, that the autonomous vehicle and the at least one other autonomous vehicle have different authorization levels to traverse at least one route within the at least one geographic zone, wherein an authorization level comprises a regulatory restriction updated by a government authority;

match, by the transportation management system, the transportation request with the autonomous vehicle based on a first authorization level of the autonomous vehicle and a second authorization level of the at least one other autonomous vehicle to traverse the at least one route, wherein the first authorization level indicates that the at least one of the pickup location or the drop-off location is traversable by the autonomous vehicle based on a regulatory restriction and the training level of the autonomous vehicle to perform driving maneuvers to the pickup location or the drop-off location and wherein the second authorization level indicates that the at least one of the pickup location or the drop-off location is non-traversable by the at least one other autonomous vehicle based on a regulatory restriction and a training level of the at least one other autonomous vehicle to perform driving maneuvers to the pickup location or the drop-off location; and instruct, by the transportation management system, the autonomous vehicle to travel to the pickup location of the transportation request along the at least one route, such that the matching improves an efficiency of the autonomous vehicle and an efficiency of the transportation management system.

* * * * *